(12) United States Patent
Marietta et al.

(10) Patent No.: US 11,205,214 B2
(45) Date of Patent: Dec. 21, 2021

(54) METHOD AND SYSTEM FOR AUTOMATICALLY REPLENISHING CONSUMABLE ITEMS

(71) Applicants: Luke Marietta, Pleasant Prairie, WI (US); Matthew Whitener, Whitefish Bay, WI (US)

(72) Inventors: Luke Marietta, Pleasant Prairie, WI (US); Matthew Whitener, Whitefish Bay, WI (US)

( * ) Notice: Subject to any disclaimer, the term of this patent is extended or adjusted under 35 U.S.C. 154(b) by 42 days.

(21) Appl. No.: 16/940,667

(22) Filed: Jul. 28, 2020

(65) Prior Publication Data

US 2021/0035189 A1 Feb. 4, 2021

Related U.S. Application Data

(60) Provisional application No. 62/879,823, filed on Jul. 29, 2019.

(51) Int. Cl.
| | |
|---|---|
| *G06Q 30/00* | (2012.01) |
| *G06Q 30/06* | (2012.01) |
| *G06N 5/04* | (2006.01) |
| *G06Q 10/08* | (2012.01) |
| *G06Q 20/12* | (2012.01) |
| *G06Q 30/02* | (2012.01) |
| *G06Q 10/10* | (2012.01) |

(Continued)

(52) U.S. Cl.
CPC ....... *G06Q 30/0633* (2013.01); *G06F 16/953* (2019.01); *G06K 7/1413* (2013.01); *G06N 5/04* (2013.01); *G06N 20/00* (2019.01); *G06Q 10/083* (2013.01); *G06Q 10/0875* (2013.01); *G06Q 10/10* (2013.01); *G06Q 20/085* (2013.01); *G06Q 20/127* (2013.01); *G06Q 30/0273* (2013.01); *G06Q 30/0609* (2013.01); *G06Q 30/0643* (2013.01); *G06Q 50/01* (2013.01); *G10L 15/22* (2013.01); *H04L 67/10* (2013.01); *G06Q 30/0631* (2013.01)

(58) Field of Classification Search
None
See application file for complete search history.

(56) References Cited

U.S. PATENT DOCUMENTS

| | | |
|---|---|---|
| 4,028,537 A | 6/1977 | Snow |
| 4,546,382 A | 10/1985 | McKenna et al. |

(Continued)

OTHER PUBLICATIONS

IP.com NPL Search Strategy (Year: 2021).*
STIC EIC 3600 Search Report (Year: 2021).*

*Primary Examiner* — Matthew T Sittner
(74) *Attorney, Agent, or Firm* — Lesavich High-Tech Law Group, S.C.; Stephen Lesavich

(57) ABSTRACT

A method and system for automatically replenishing consumable items. A consumer is allowed to scan in product codes for consumable items with a camera component on a network device such as a mobile phone. The consumer is also allowed to select desired vendors from which to purchase the selected consumable items, select payment options, select delivery options, create and select list of consumable items to be automatically replenished and create and select lists of consumable items that can be shared on-line and on social media so family, relatives, friends or neighbors of the consumer can purchase items for the consumer when the family, relatives, friends or neighbors are doing their own shopping.

22 Claims, 12 Drawing Sheets

(51) Int. Cl.
*G06Q 20/08* (2012.01)
*G06Q 50/00* (2012.01)
*G06K 7/14* (2006.01)
*G06F 16/953* (2019.01)
*G10L 15/22* (2006.01)
*H04L 29/08* (2006.01)
*G06N 20/00* (2019.01)

(56) References Cited

U.S. PATENT DOCUMENTS

| | | |
|---|---|---|
| 4,816,904 A | 3/1989 | McKenna et al. |
| 4,898,270 A | 2/1990 | Hopkins et al. |
| 5,034,902 A | 7/1991 | Steinmann |
| 5,388,165 A | 2/1995 | Deaton et al. |
| 5,448,471 A | 9/1995 | Deaton et al. |
| 5,490,060 A | 2/1996 | Malec et al. |
| 5,592,560 A | 1/1997 | Deaton et al. |
| 5,594,493 A | 1/1997 | Nemirofsky |
| 5,687,322 A | 11/1997 | Deaton et al. |
| 5,913,210 A | 6/1999 | Call |
| 5,978,773 A | 11/1999 | Hudetz et al. |
| 6,021,362 A | 2/2000 | Maggard et al. |
| 6,134,557 A | 10/2000 | Freeman |
| 6,154,738 A | 11/2000 | Call |
| 6,307,958 B1 | 10/2001 | Deaton et al. |
| 6,418,441 B1 | 7/2002 | Call |
| 6,424,949 B1 | 7/2002 | Deaton et al. |
| 6,546,418 B2 | 4/2003 | Schena et al. |
| 6,659,346 B1 | 12/2003 | Williams |
| 6,741,968 B2 | 5/2004 | Jacoves et al. |
| 6,851,611 B1 | 2/2005 | Shaw-Sinclair |
| 7,069,233 B2 | 6/2006 | Bracken et al. |
| 7,350,702 B2 | 4/2008 | Bortolin et al. |
| 7,356,486 B2 | 4/2008 | Sullivan et al. |
| 7,367,501 B2 | 5/2008 | Bortolin et al. |
| 7,571,856 B2 | 8/2009 | Lo |
| 7,611,054 B2 | 11/2009 | Bortolin et al. |
| 7,628,319 B2 | 12/2009 | Brown et al. |
| 7,654,451 B2 | 2/2010 | Bortolin et al. |
| 7,660,739 B2 | 2/2010 | Fowler |
| 7,689,473 B2 | 3/2010 | Borom et al. |
| 7,748,623 B2 | 7/2010 | Barber |
| 7,792,712 B2 | 9/2010 | Kantarjiev et al. |
| 7,857,221 B2 | 12/2010 | Kuhno et al. |
| 7,866,548 B2 | 1/2011 | Reed et al. |
| 7,873,529 B2 | 1/2011 | Kruger et al. |
| 7,873,547 B2 | 1/2011 | Borom et al. |
| 7,900,831 B2 | 3/2011 | Bortolin et al. |
| 7,983,957 B2 | 7/2011 | Gabriel et al. |
| 8,032,397 B2 | 10/2011 | Lawless |
| 8,181,866 B2 | 5/2012 | Bowlus |
| 8,386,309 B2 | 2/2013 | Thibedeau et al. |
| 8,412,629 B2 | 4/2013 | Masi |
| 8,448,859 B2 | 5/2013 | Goncalves et al. |
| 8,463,765 B2 | 6/2013 | Lesavich |
| 8,464,937 B2 | 6/2013 | Reed et al. |
| 8,494,909 B2 | 7/2013 | Goncalves |
| 8,579,187 B2 | 11/2013 | Normile |
| 8,818,871 B2 | 8/2014 | Humpleman et al. |
| 8,850,485 B2 | 9/2014 | Barnes |
| 8,898,941 B2 | 12/2014 | Massullo |
| 8,928,923 B2 | 1/2015 | Nunez |
| 9,037,564 B2 | 5/2015 | Lesavich et al. |
| 9,076,121 B2 | 7/2015 | Tang et al. |
| 9,098,855 B2 | 8/2015 | Thibedeau et al. |
| 9,137,250 B2 | 9/2015 | Lesavich et al. |
| 9,152,828 B2 | 10/2015 | Goncalves et al. |
| 9,171,328 B2 | 10/2015 | Argue et al. |
| 9,213,506 B2 | 12/2015 | Nunez |
| 9,292,993 B2 | 3/2016 | Canter et al. |
| 9,361,479 B2 | 6/2016 | Lesavich et al. |
| 9,538,209 B1 | 1/2017 | Kokenos |
| 9,547,464 B2 | 1/2017 | Nunez |
| 9,569,771 B2 | 2/2017 | Lesavich et al. |
| 9,661,942 B2 | 5/2017 | Leyden |
| 9,812,022 B2 | 11/2017 | Wayman et al. |
| 9,846,871 B2 | 12/2017 | Junger et al. |
| 9,865,000 B1 | 1/2018 | Lopez et al. |
| 9,886,713 B2 | 2/2018 | Borom et al. |
| 9,959,561 B2 | 5/2018 | Reed et al. |
| 10,055,710 B2 | 8/2018 | Sheth et al. |
| 10,083,475 B2 | 9/2018 | Reed et al. |
| 10,083,561 B2 | 9/2018 | Sundaresan |
| 10,102,551 B2 | 10/2018 | Carr et al. |
| 10,339,498 B2 | 7/2019 | Sheth et al. |
| 10,387,922 B2 | 8/2019 | Gopalsamy et al. |
| 10,387,933 B2 | 8/2019 | Blake et al. |
| 10,445,816 B2 | 10/2019 | Carr et al. |
| 10,510,091 B1 | 12/2019 | Lesley |
| 10,636,037 B1 | 4/2020 | Elzoghbi |
| 2003/0158796 A1* | 8/2003 | Balent .................. G06Q 10/087 705/28 |
| 2011/0208710 A1 | 8/2011 | Lesavich |
| 2012/0278622 A1 | 11/2012 | Lesavich et al. |
| 2014/0189792 A1 | 7/2014 | Lesavich et al. |
| 2015/0193853 A1 | 7/2015 | Ayzenshtat |
| 2015/0269602 A1 | 9/2015 | Novick |
| 2015/0356502 A1 | 12/2015 | Agasti |
| 2015/0379301 A1 | 12/2015 | Lesavich et al. |
| 2015/0379550 A1 | 12/2015 | Warner |
| 2016/0042436 A1 | 2/2016 | Borom |
| 2016/0048798 A1 | 2/2016 | Meyer |
| 2016/0140526 A1* | 5/2016 | Cummins ............ G06Q 20/308 705/28 |
| 2016/0225029 A1 | 8/2016 | VanDeVelde |
| 2016/0232560 A1 | 8/2016 | VanDeVelde |
| 2016/0232624 A1 | 8/2016 | Goldberg |
| 2016/0267576 A1 | 9/2016 | Crossman Sullivan |
| 2016/0321654 A1 | 11/2016 | Lesavich et al. |
| 2016/0364681 A1 | 12/2016 | Andrus |
| 2017/0048672 A1* | 2/2017 | Herz .................. G06Q 30/0267 |
| 2017/0147971 A1 | 5/2017 | Morse |
| 2017/0293984 A1 | 10/2017 | Goldberg |
| 2017/0316488 A1 | 11/2017 | Kremen |
| 2017/0345086 A1 | 11/2017 | Richardson |
| 2017/0372258 A1 | 12/2017 | Narasimhan |
| 2018/0025409 A1 | 1/2018 | Driscoll |
| 2018/0033016 A1 | 2/2018 | Mayman |
| 2018/0047081 A1 | 2/2018 | Sheth |
| 2018/0108073 A1 | 4/2018 | Borom |
| 2018/0114184 A1 | 4/2018 | Brooks |
| 2018/0189620 A1 | 7/2018 | Sheth |
| 2018/0247284 A1 | 8/2018 | Novick |
| 2018/0260813 A1 | 9/2018 | Pi Farias |
| 2018/0260814 A1 | 9/2018 | Pi Farias |
| 2018/0285972 A1 | 10/2018 | Chrapko |
| 2018/0300797 A1 | 10/2018 | Krishnamurthy |
| 2018/0322511 A1 | 11/2018 | Sheth |
| 2018/0322512 A1 | 11/2018 | Sheth |
| 2018/0336597 A1 | 11/2018 | Singh |
| 2018/0341955 A1 | 11/2018 | Amarthaluri |
| 2018/0349884 A1 | 12/2018 | Sharma |
| 2019/0005852 A1 | 1/2019 | Heinrichs |
| 2019/0034931 A1 | 1/2019 | Cash |
| 2019/0038062 A1 | 2/2019 | Sundarean |
| 2019/0066175 A1* | 2/2019 | Godsey ............. G06Q 30/0641 |
| 2019/0073710 A1 | 3/2019 | Dorner |
| 2019/0080277 A1 | 3/2019 | Trivelpiece |
| 2019/0087800 A1 | 3/2019 | Cummins |
| 2019/0095174 A1 | 3/2019 | Trudel |
| 2019/0114305 A1 | 4/2019 | Ecker |
| 2019/0127099 A1 | 5/2019 | Langen |
| 2019/0163942 A1 | 5/2019 | Lavery |
| 2019/0164180 A1 | 5/2019 | Koell |
| 2019/0017714 A1 | 6/2019 | Simons |
| 2019/0018692 A1 | 6/2019 | Belt |
| 2019/0172123 A1 | 6/2019 | Pugh |
| 2019/0172375 A1 | 6/2019 | Heinrichs |
| 2019/0180315 A1 | 6/2019 | Wood |
| 2019/0180383 A1 | 6/2019 | Reiskind |
| 2019/0188435 A1 | 6/2019 | Davis |
| 2019/0213570 A1 | 7/2019 | Rose |
| 2019/0228039 A1 | 7/2019 | Doble |
| 2019/0228397 A1 | 7/2019 | Madden |

(56) References Cited

U.S. PATENT DOCUMENTS

| | | |
|---|---|---|
| 2019/0236642 A1 | 8/2019 | Winner |
| 2019/0241298 A1 | 8/2019 | Brooks |
| 2019/0244043 A1 | 8/2019 | Bradley |
| 2019/0244204 A1 | 8/2019 | McLaughlin |
| 2019/0249887 A1 | 8/2019 | Hauville |
| 2019/0251544 A1 | 8/2019 | D'Agostino |
| 2019/0252069 A1 | 8/2019 | Caputo |
| 2019/0258814 A1 | 8/2019 | Heeter |
| 2019/0259123 A1 | 8/2019 | Barnett |
| 2019/0259124 A1 | 8/2019 | Barnett |
| 2019/0268248 A1 | 8/2019 | Chan |
| 2019/0272579 A1 | 9/2019 | Edwards |
| 2019/0295143 A1 | 9/2019 | Ng |
| 2019/0295385 A1 | 9/2019 | Mattingly |
| 2019/0303374 A1 | 10/2019 | Doble |
| 2019/0304587 A1 | 10/2019 | Cantrell |
| 2019/0311364 A1 | 10/2019 | Dunjic |
| 2019/0312882 A1 | 10/2019 | D'Agostino |
| 2019/0312883 A1 | 10/2019 | McCarter |
| 2019/0325470 A1 | 10/2019 | Camacho |
| 2019/0333079 A1 | 10/2019 | Robeen |
| 2019/0337656 A1 | 11/2019 | Langen |
| 2019/0337719 A1 | 11/2019 | Tovey |
| 2019/0340306 A1 | 11/2019 | Harrison |
| 2019/0347680 A1 | 11/2019 | Layman |
| 2019/0354974 A1 | 11/2019 | Carvalho |
| 2019/0354996 A1 | 11/2019 | Dearing |
| 2019/0370773 A1 | 12/2019 | Salmon |
| 2019/0378143 A1 | 12/2019 | Volpi |
| 2019/0378219 A1 | 12/2019 | Chrapko |
| 2019/0382173 A1 | 12/2019 | Knight |
| 2020/0005226 A1 | 1/2020 | Sikka |
| 2020/0005347 A1 | 1/2020 | Boal |
| 2020/0038917 A1 | 2/2020 | McBride |
| 2020/0039411 A1 | 2/2020 | Paschal |
| 2020/0042758 A1 | 2/2020 | Shamiss |
| 2020/0042914 A1 | 2/2020 | Karmakar |
| 2020/0042937 A1 | 2/2020 | Karmakar |
| 2020/0043234 A1 | 2/2020 | Russ |
| 2020/0050813 A1 | 2/2020 | Bonner |
| 2020/0051019 A1 | 2/2020 | Kamani |
| 2020/0065886 A1 | 2/2020 | Leon |
| 2020/0066115 A1 | 2/2020 | Sweeney |
| 2020/0082172 A1 | 3/2020 | Truong |
| 2020/0104556 A1 | 4/2020 | Gillet |
| 2020/0111052 A1 | 4/2020 | Agasti |
| 2020/0118076 A1 | 4/2020 | Ballaro |
| 2020/0125907 A1 | 4/2020 | Sheth |
| 2020/0134707 A1 | 4/2020 | Baird-Smith |
| 2020/0136829 A1 | 4/2020 | Keon |
| 2020/0143334 A1 | 5/2020 | Kayara |
| 2020/0143359 A1 | 5/2020 | Jung |
| 2020/0143452 A1 | 5/2020 | Jung |
| 2020/0151663 A1 | 5/2020 | Balakrishnan |
| 2020/0162350 A1 | 5/2020 | Chrapko |
| 2020/0167534 A1 | 5/2020 | Elizondo |
| 2020/0167841 A1 | 5/2020 | Caldwell |
| 2020/0180935 A1 | 6/2020 | Zumtobel |
| 2020/0193252 A1 | 6/2020 | Guinard |
| 2020/0196018 A1 | 6/2020 | Burbank |
| 2020/0198680 A1 | 6/2020 | Hagen |
| 2020/0198894 A1 | 6/2020 | Jarvis |
| 2020/0211046 A1 | 7/2020 | Castinado |
| 2020/0226538 A1 | 7/2020 | Jung |
| 2020/0234229 A1 | 7/2020 | Bolha |
| 2020/0234325 A1 | 7/2020 | Hoque |

\* cited by examiner

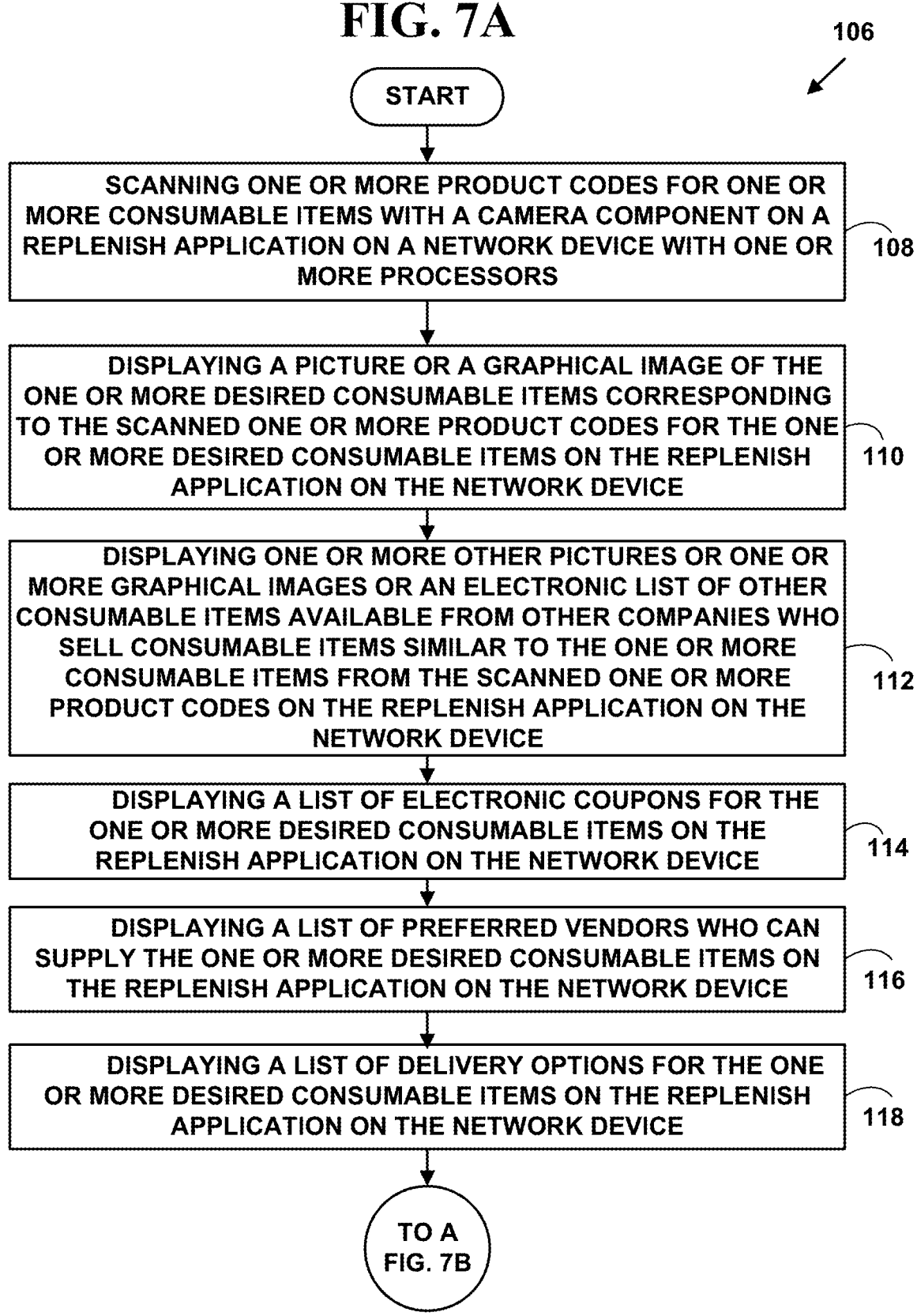

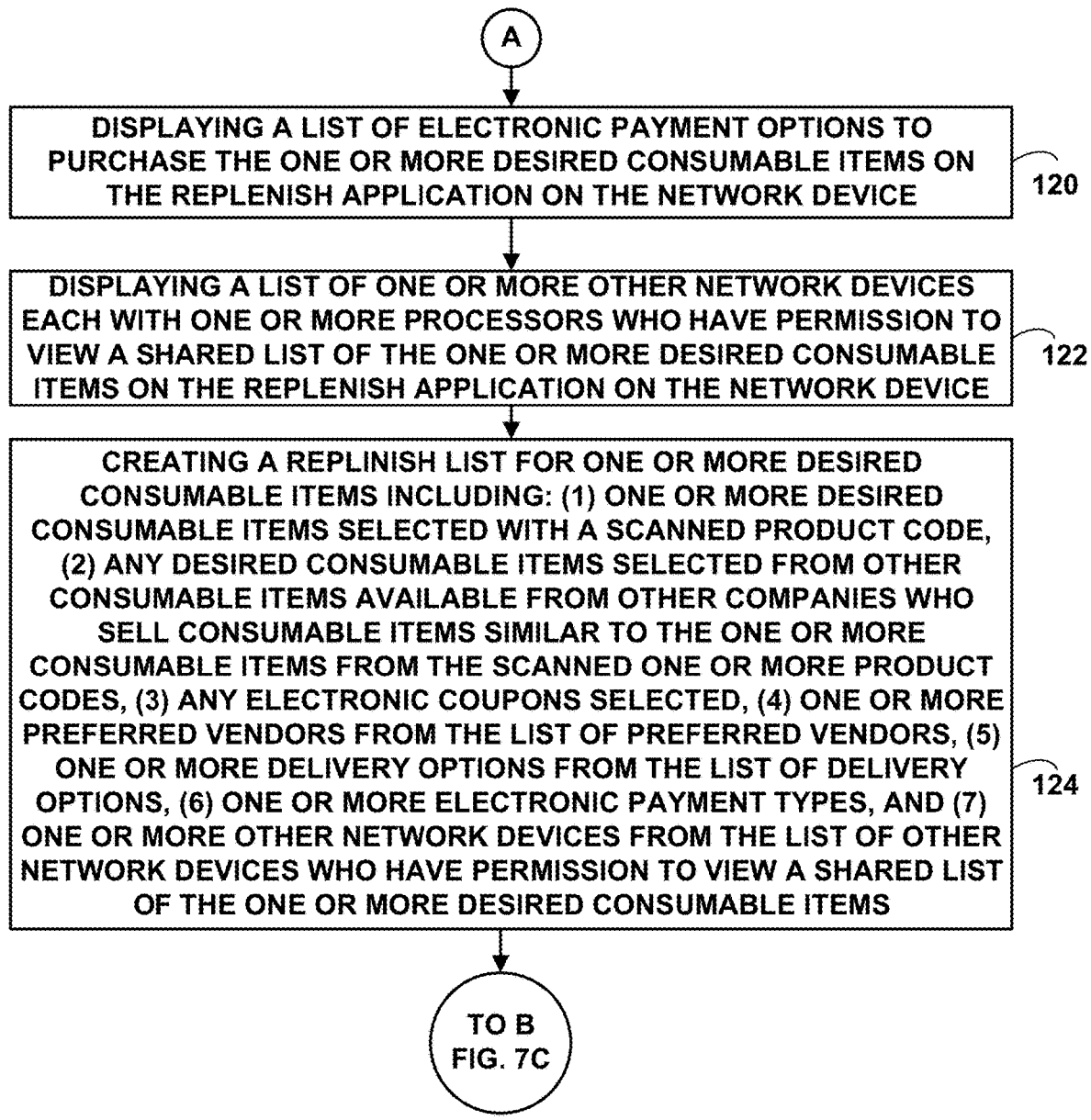

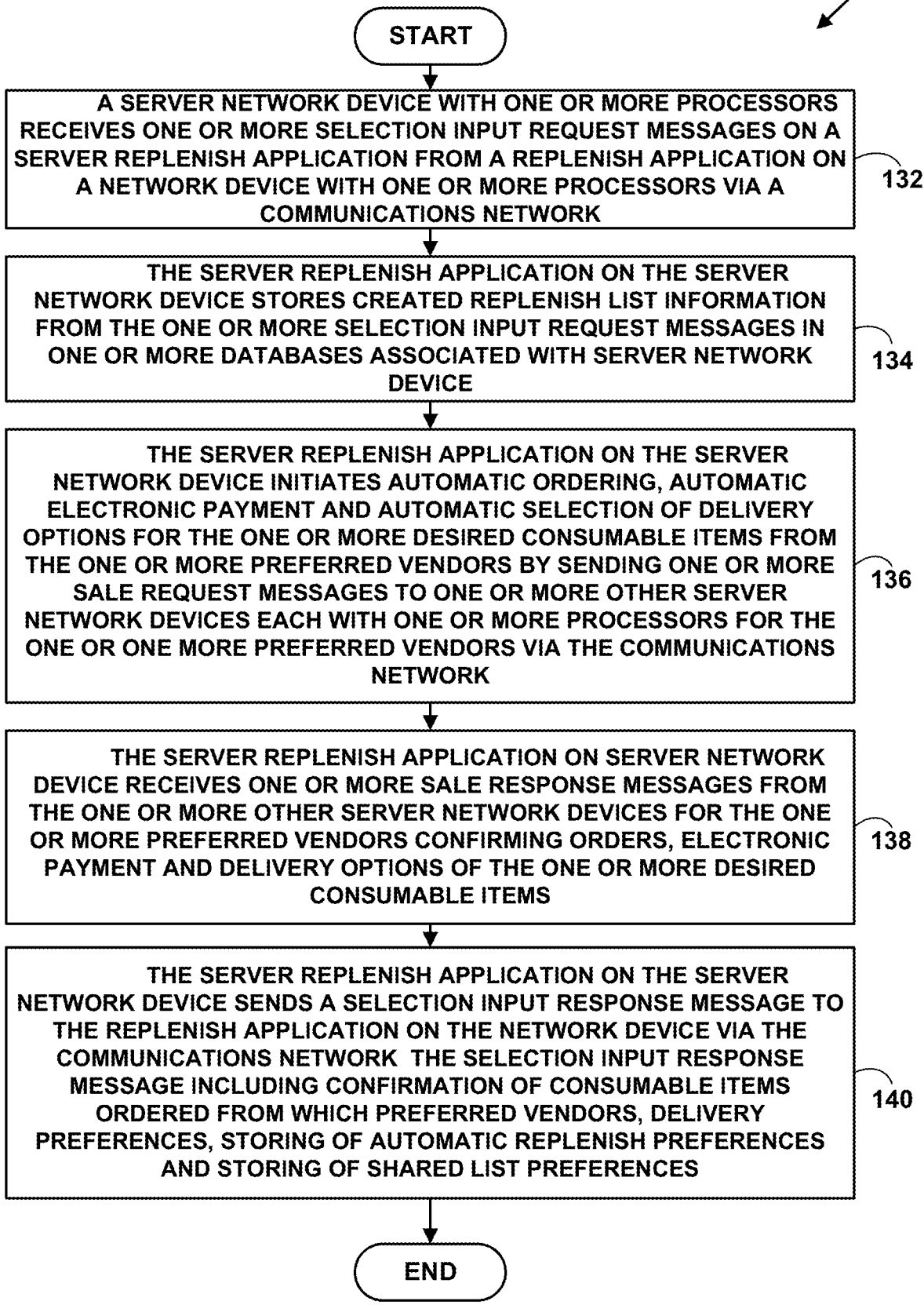

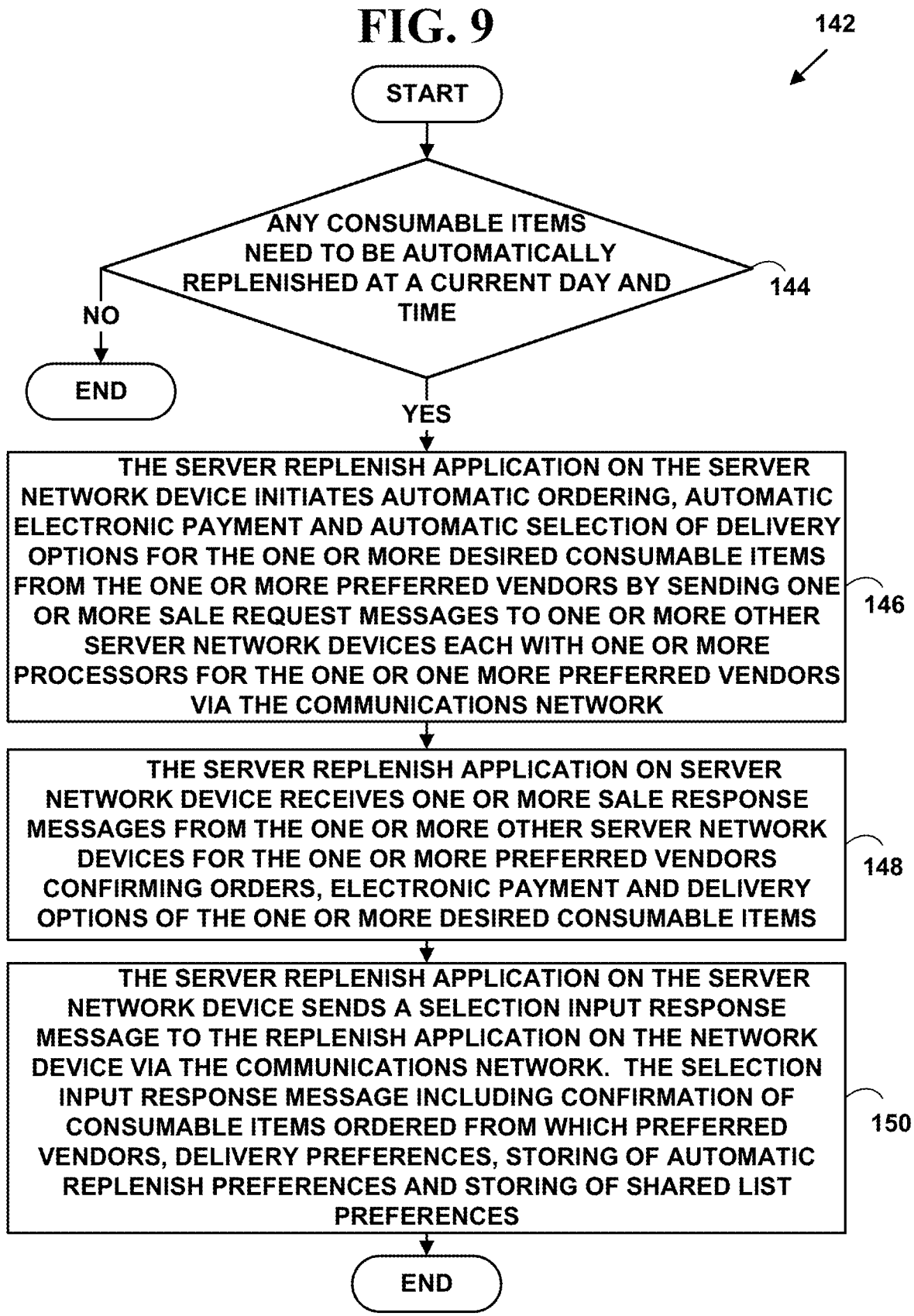

START

↓

ONE OR MORE FIRST COLLABORATION REQUEST MESSAGES ARE SENT FROM THE REPLENISH APPLICATION ON THE NETWORK DEVICE TO ONE OR MORE OTHER NETWORK DEVICES EACH WITH ONE OR MORE PROCESSORS INCLUDED ON THE SHARED LIST VIA THE COMMUNICATIONS NETWORK, THE ONE OR MORE FIRST COLLABORATION MESSAGES INDICATING THE NETWORK DEVICE IS AT A PHYSICAL LOCATION FOR A DESIRED VENDOR WHO SELLS CONSUMABLE ITEMS — 154

↓

ONE OR MORE SECOND COLLABORATION REQUEST MESSAGES ARE SENT FROM THE REPLENISH APPLICATION ON THE NETWORK DEVICE TO ONE OR MORE OTHER NETWORK DEVICES VIA THE COMMUNICATIONS NETWORK, THE ONE OR MORE SECOND COLLABORATION REQUEST MESSAGES REQUESTING ONE OR MORE CONSUMABLE ITEMS DESIRED BY THE ONE OR MORE OTHER NETWORK DEVICES TO BE PURCHASED BY THE NETWORK DEVICE FOR OTHER ONE OR MORE NETWORK DEVICES — 156

↓

ONE OR MORE SECOND COLLABORATION RESPONSE MESSAGES ARE RECEIVED ON THE REPLENISH APPLICATION ON THE NETWORK DEVICE FROM THE OR MORE OTHER NETWORK DEVICES VIA THE COMMUNICATIONS NETWORK, THE ONE OR MORE ONE OR MORE SECOND COLLABORATION RESPONSE MESSAGES INCLUDING ONE OR MORE CONSUMABLE ITEMS TO BE PURCHASED FOR THE ONE OR MORE OTHER NETWORK DEVICES — 158

↓

THE REPLENISH APPLICATION ON THE NETWORK DEVICE INITIATES PURCHASING, AUTOMATIC ELECTRONIC PAYMENT AND AUTOMATIC SELECTION OF DELIVERY OPTIONS FOR THE ONE OR MORE CONSUMABLE ITEMS TO BE PURCHASED FOR THE ONE OR MORE OTHER NETWORK DEVICES AT THE PHYSICAL LOCATION OF THE DESIRED VENDOR — 160

↓

ONE OR MORE COLLABORATION PURCHASE CONFIRMATION MESSAGES ARE SENT FROM THE REPLENISH APPLICATION ON THE NETWORK DEVICE TO THE OR MORE OTHER NETWORK DEVICES VIA THE COMMUNICATIONS NETWORK CONFIRMING PURCHASE OF THE ONE OR MORE CONSUMABLE ITEMS AT THE PHYSICAL LOCATION OF THE DESIRED VENDOR — 162

↓

END

METHOD AND SYSTEM FOR AUTOMATICALLY REPLENISHING CONSUMABLE ITEMS

CROSS REFERENCES TO RELATED APPLICATIONS

This U.S. Utility patent application claims priority from U.S. Provisional patent application No. 62/879,823, filed on Jul. 29, 2019, the contents of which are incorporated by reference.

FIELD OF INVENTION

This invention relates to replenishing consumable items. More specifically, it relates to a method and system for automatically replenishing consumable items.

BACKGROUND OF THE INVENTION

Just about every consumer purchases and uses consumable items such as food items, cleaning supplies, personal grooming supplies, pet supplies, laundry supplies, household maintenance supplies, baby supplies and other types of consumable items that are consumed (i.e., used up, etc.) by consumers.

To replace such consumable items, many consumers make lists of the items on paper or on an electronic device (e.g., mobile phone, etc.) to purchase in one or more stores. Some consumers replenish such consumable items by ordering them directly on-line (e.g., from AMAZON.com, grocery stores, retail stores, pet supply stores, etc.). Other consumers order such consumable items directly by telephone or by visiting a physical grocery store, retail store, pet supply store, etc.

Different consumers prefer different delivery options when ordering consumable items. Some consumers will collect the consumable items themselves and place in a physical cart or basket and purchase them directly. Other consumers will call ahead or order ahead and pick up the consumable items at one or more stores. Other consumers will have the consumable items they order delivered by a delivery service. Other consumers will choose to order online, with aforementioned delivery options listed above.

There are several problems associated with replenishing such consumable items. One problem is that consumers tend to buy the same items on a regular basis. As a result, such consumers prepare the same lists with the same items over and over which wastes time and energy.

Another problem is that consumers take the same actions over and over on a regular basis to order such consumable items which wastes time and energy.

Another problem is that consumers tend to use the same delivery options on a regular basis. Selecting such delivery options over and over wastes time and energy.

Another problem is that when such consumable items are ordered on-line or over the phone, the consumer may not understand which consumable items from which company, what size, etc. they are ordering without visual confirmation. For example, if the user desires a package of corn, will the corn be GREEN GIANT, DEL MONTE, a generic store brand, etc.

Another problem is that a consumer may desire to order a specific specialty consumable product that can be purchased only with a specific Universal Product Code (UPC) code or other product identifier. There is typically no way to directly order such consumable items on-line or over the phone.

Another problem is that there is typically no parental control or other supervisory control associated with ordering such consumable items. Therefore, a child or other person could intentionally or inadvertently order multiple or undesired consumable items.

Another problem is that most consumable items cannot be added to a list so that the items are automatically replenished based on a pre-determined time frame automatically determined with Artificial Intelligence (AI) methods.

Another problem is that lists of consumable items cannot be shared among family, relatives, friends and neighbors on-line or on social media. If such lists could be shared, then one person going to a store could buy items for others. For example, suppose a new mother with a new baby needed diapers but could not leave the house. A family member, relatives, friends or neighbor could view her shopping list on-line and buy the new mother the diapers when they doing they own shopping.

Another problem is that consumers do not have an easily available, complete or accurate inventory of items to be replenished or an item in an out of stock state nearing depletion. Current physical lists and electronically generated lists do not capture, catalog, track, or provide access to this valuable information which can streamline the replenishment process and help consumers avoid return trips to physical grocery store, retail store, pet supply store, etc.

Thus, it is desirable to solve some of the problems associated with automatically replenishing consumable items.

SUMMARY OF THE INVENTION

In accordance with preferred embodiments of the present invention, some of the problems associated with replenishing consumable items, a method and system for automatically replenishing consumable items is presented.

The method and system allow a consumer to scan in product codes for consumable items with a camera component on a network device such as a mobile phone or countertop scanner. The consumer is also allowed to select desired vendors from which to purchase the selected consumable items, select payment options, select delivery options, create and select list of consumable items to be automatically replenished and create and select lists of consumable items that can be shared on-line and on social media so family, relatives, friends, neighbors of the consumer can purchase items for the consumer when the family, relatives, friends, or neighbors are doing their own shopping. The method and system allows a consumer to record and maintain easily accessible inventory of on-hand replenishable items and generate predictive lists of items nearing depletion based on historical usage patterns.

The foregoing and other features and advantages of preferred embodiments of the present invention will be more readily apparent from the following detailed description. The detailed description proceeds with references to the accompanying drawings.

Preferred embodiments of the present invention are described with reference to the following drawings, wherein:

FIGS. 7A, 7B and 7C are a flow diagram illustrating a method for automatically replenishing consumable items;

FIG. 8 is a flow diagram illustrating a method for automatically replenishing consumable items;

FIG. 9 is a flow diagram illustrating a method for automatically replenishing consumable items; and FIG. 10 is a flow diagram illustrating a method for automatically replenishing consumable items.

DETAILED DESCRIPTION OF THE INVENTION

Exemplary Electronic Message Processing and Display System

Figure 1:
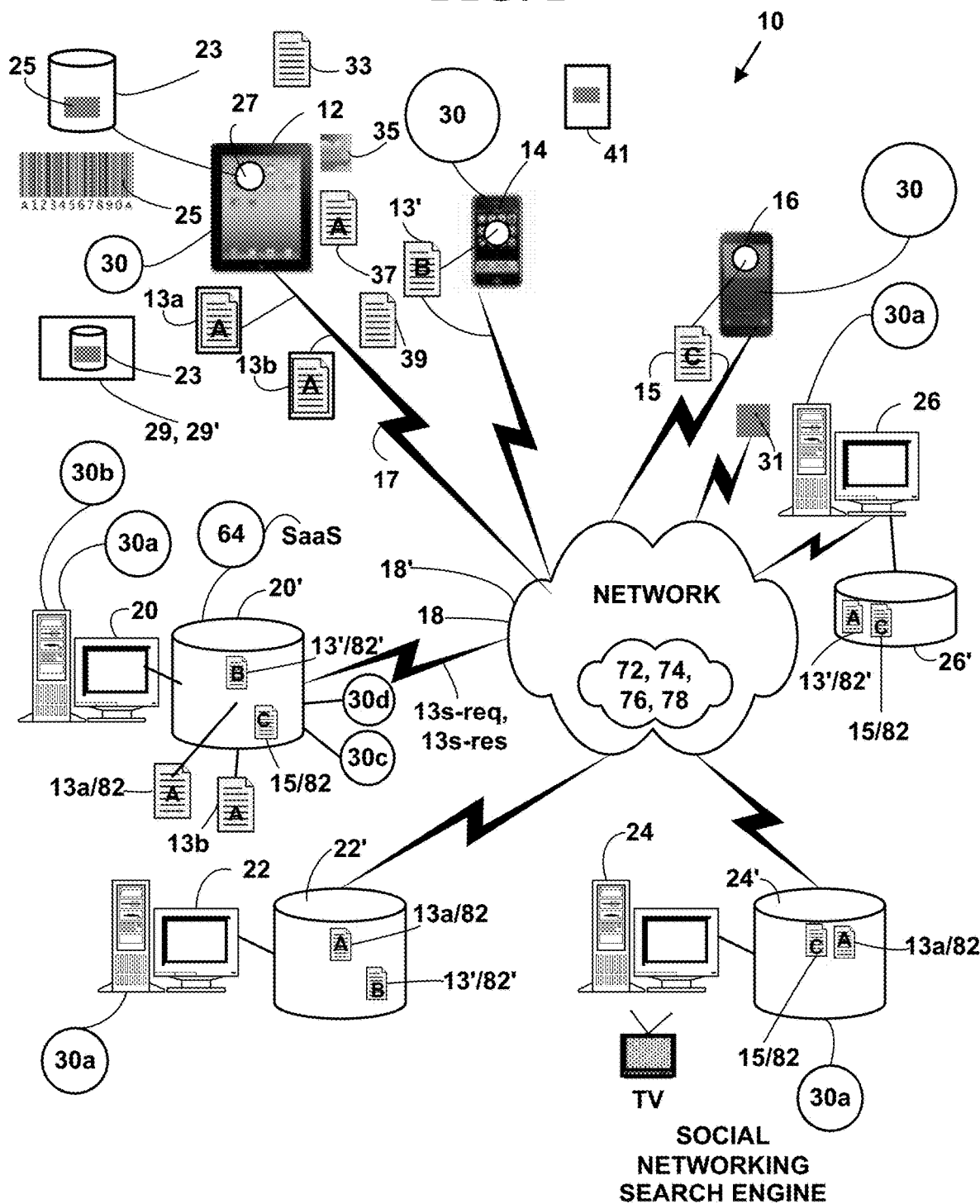
FIG. 1 is a block diagram illustrating an exemplary electronic item replenishment processing and display system.

FIG. 1 is a block diagram illustrating an exemplary electronic item replenishment processing and display system 10 for automatically replenishing consumable items. The exemplary electronic system 10 includes, but is not limited to, one or more target network devices 12, 14, 16, etc. each with one or more processors and each with a non-transitory computer readable medium.

The one or more target network devices 12, 14, 16 (illustrated in FIG. 1 only as a tablet and two smart phones for simplicity) include, but are not limited to, desktop computers, laptop computers, tablet computers, mobile phones, non-mobile phones, smart phones, personal digital/data assistants (PDA), digital cameras, portable game consoles, non-portable game consoles, wearable network devices 96-104, Internet of Things (IoT) devices, smart speakers 31, product code scanner network devices 41, cable television (CATV) set-top boxes, satellite television boxes, or digital televisions including high-definition (HDTV) and three-dimensional (3D) televisions and/or other types of network devices each with one or more processors.

A "smart phone" is a mobile phone 14 that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The tablet computers 12 include, but are not limited to, tablet computers such as the IPAD, by APPLE, Inc., the HP Tablet, by HEWLETT PACKARD, Inc., the PLAYBOOK, by RIM, Inc., the TABLET, by SONY, Inc., etc.

A "smart speaker" 31 is a type of wireless speaker and voice command device with an integrated virtual assistant that offers interactive actions and hands-free activation with the help of one "hot word" (or several "hot words"). Some smart speakers can also act as a smart device that utilizes Wi-Fi, Bluetooth and other wireless protocol standards to extend usage beyond audio playback, such as to control home automation devices. This can include, but is not limited to, features such as compatibility across a number of services and platforms, peer-to-peer connection through mesh networking, virtual assistants, and others. Each can have its own designated interface and features in-house, usually launched or controlled via application or home automation software. Some smart speakers also include a screen to show the user a visual response.

The product code scanner network device 41 includes, but is not limited to, a tabletop, countertop, desktop, hand-held, product code scanner, a UPC scanner, a product code scanner integrated into an IoT device such as a refrigerator, stove, kitchen appliance, etc. However, the present invention is not limited to such embodiments and other embodiments can be used to practice the invention.

In one embodiment, the UPC scanner 41 includes a network device, with a display component and/or without a display component including an application 30 to scan in product codes of desired consumable items 25. In one embodiment, the device 41 includes a camera component. In another embodiment, the device 41 does not include a camera component but includes an optical scanning component. In another embodiment, the device 41 includes both a camera component and an optical scanning component. An optical scanning component is a component that captures visual information and translates the visual information into digital information. The device 41 is capable of understanding and displaying product codes (e.g., Universal Product Codes (UPC), bar codes, Smart Labels, etc.) However, the present invention is not limited to tabletop product code scanners 41 with such components and other tabletop product scanners can be used to practice the invention.

The IoT network devices, include but are not, limited to, security cameras, doorbells with real-time video cameras, baby monitors, televisions, set-top boxes, lighting, heating (e.g., smart thermostats, etc.), ventilation, air conditioning (HVAC) systems, and appliances such as washers, dryers, robotic vacuums, air purifiers, ovens, refrigerators, freezers, toys, game platform controllers, game platform attachments (e.g., guns, googles, sports equipment, etc.), and/or other IoT network devices, including and/or not including one or more sensors (e.g., temperature, pressure, etc.) and/or actuators.

The target network devices 12, 14, 16, 31, 41, 98-104 are in communications with a cloud communications network 18 or a non-cloud computing network 18' via one or more wired and/or wireless communications interfaces. The cloud communications network 18', is also called a "cloud computing network" herein and the terms may be used interchangeably.

The plural target network devices 12, 14, 16, 31, 41, 98-104 make requests 13, 15 for replenishment of consumable items via electronic messages (e.g., SMS, RCS, e-mail, etc.) via the cloud communications network 18 or non-cloud communications network 18'

The cloud communications network 18 and non-cloud communications network 18' includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16, 31, 41, 98-104 via the cloud communications network 18 and non-cloud communications network 18'.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, 22, 24, 26, etc.) store portions 13', 15' of the electronic content 13, 15 (e.g., replenish request messages, etc.) as cloud storage objects 82 (FIG. 5) as is described herein.

The plural server network devices 20, 22, 24 26, may be connected to, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 and non-cloud communications network 18' includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 and non-cloud communications network 18' includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices 12, 14, 16, 31, 41, 98-104, 20, 22, 24, 26 of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
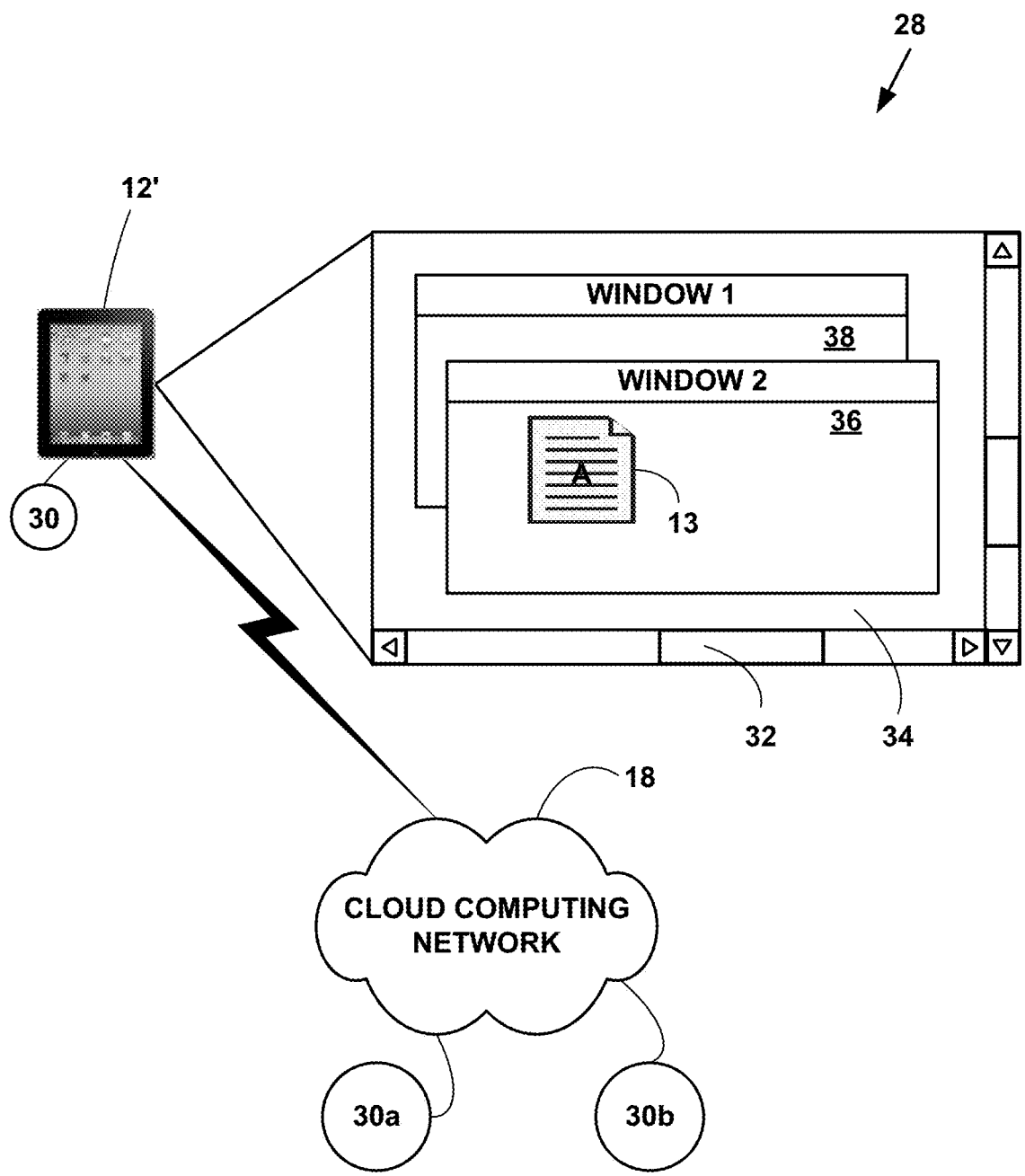
FIG. 2 is a block diagram illustrating an exemplary electronic item display system.

FIG. 2 is a block diagram illustrating an exemplary electronic item display system 28. The exemplary electronic message information display system 12' includes, but is not limited to, a target network device (e.g., 12, etc.) with an application 30 and a display component 32. The application 30 presents a graphical user interface (GUI) 34 on the display 32 component. The GUI 34 presents a multi-window 36, 38, etc. (only two of which are illustrated) interface to a user.

In one embodiment of the invention, the application 30 is a software application. However, the present invention is not limited to this embodiment and the application 30 can be hardware, firmware, hardware and/or any combination thereof. In one embodiment, the application 30 is a mobile application for a smart phone, electronic tablet and/or other network device. In another embodiment, the application 30a, 30b, 30c, 30d is a cloud application used on a cloud communications network 18. However, the present invention is not limited these embodiments and other embodiments can be used to practice the invention In another embodiment, a portion of the application 30 is executing on the target network devices 12, 14, 16, 31, 41, 98-104 and another portion of the application 30a, 30b, 30c, 30d is executing on the server network devices 20, 22, 24, 26. The applications also include one or more library applications. However, the present invention is not limited these embodiments and other embodiments can be used to practice the invention.

Exemplary Networking Protocol Stack

Figure 3:
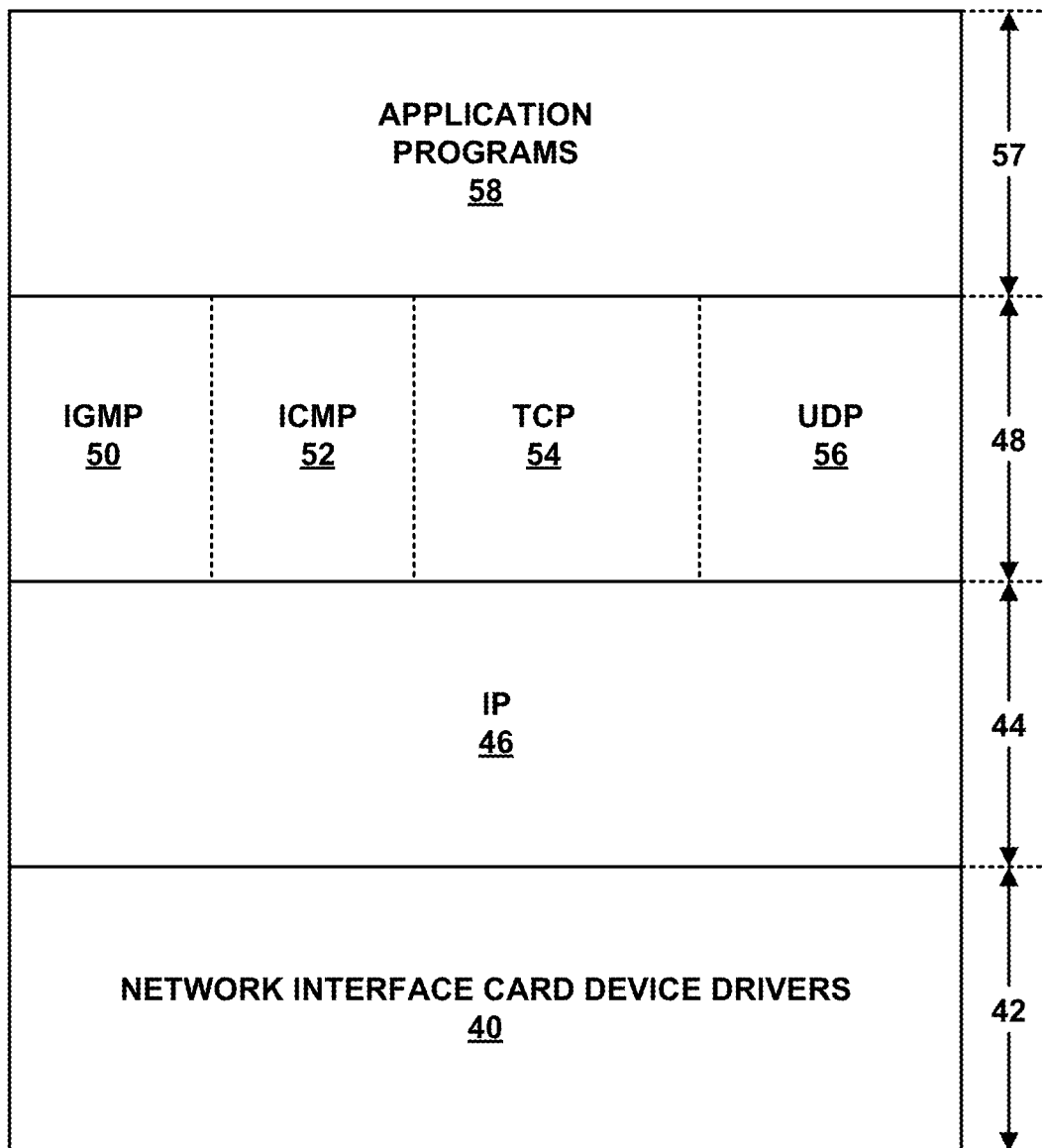
FIG. 3 is a block diagram illustrating an exemplary networking protocol stack.

FIG. 3 a block diagram illustrating a layered protocol stack 38 for network devices in the electronic message information display system 10. The layered protocol stack 38 is described with respect to Internet Protocol (IP) suites comprising in general from lowest-to-highest, a link 42, network 44, transport 48 and application 56 layers. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 20, 22, 24, 26, 31, 41, 98-104 are connected to the communication network 18 with Network Interface Card (NIC) cards including device drivers 40 in a link layer 42 for the actual hardware connecting the network devices 12, 14, 16, 20, 22, 24, 26, 31, 41, 98-104 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18.

The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more, fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30a, 30b, 30c, 30d, etc.) to carry out desired functionality for a network device reside. For example, the application programs 58 for the client network devices 12, 14, 16, 31, 98-104 may include web-browsers or other application programs, application program 30, while application programs for the server network devices 20, 22, 24, 26 may include other application programs (e.g., 30a, 30b, 30c, 30d, etc.).

In one embodiment, application program 30 includes a replenish application 30a, an Artificial Intelligence (AI) replenish application 30b, a Big Data replenish application 30c and/or other application 30d. However, the present invention is not limited to such an embodiment and more, fewer and/or other applications can be used to practice the invention.

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

In addition, markup languages such as HyperText Markup Language (HTML), EXtensible Markup Language (XML) and others are used.

HyperText Markup Language (HTML) is a markup language for creating web pages and other information that can be displayed in a web browser.

HTML is written in the form of HTML elements consisting of tags enclosed in angle brackets within the web page content. HTML tags most commonly come in pairs although some tags represent empty elements and so are unpaired. The first tag in a pair is the start tag, and the second tag is the end tag (they are also called opening tags and closing tags). In between these tags web designers can add text, further tags, comments and other types of text-based content.

The purpose of a web browser is to read HTML documents and compose them into visible or audible web pages. The browser does not display the HTML tags, but uses the tags to interpret the content of the page.

HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages.

EXtensible Markup Language (XML) is another markup language that defines a set of rules for encoding documents in a format that is both human-readable and machine-readable. It is defined in the XML 1.0 Specification produced by the W3C, the contents of which are incorporated by reference and several other related specifications, all free open standards.

XML a textual data format with strong support via Unicode for the languages of the world. Although the design of XML focuses on documents, it is widely used for the representation of arbitrary data structures, for example in web services. The oldest schema language for XML is the Document Type Definition (DTD). DTDs within XML documents define entities, which are arbitrary fragments of text and/or markup tags that the XML processor inserts in the DTD itself and in the XML document wherever they are referenced, like character escapes.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Wireless Interfaces

In one embodiment of the present invention, the wireless interfaces on network devices 12, 14, 16, 20, 22, 24, 26, 31, 41, 98-104 include but are not limited to, IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. Wi-Fi Aware is based on the Wi-Fi Alliance Neighbor Awareness Networking (NAN) Technical Specification. It enables network devices to discover nearby information and services and initiate interactions with people and services without a connection to a wireless access point.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without buses can also be used to practice the invention.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18 or non-cloud communications network 18'.

The one or more target network devices 12, 14, 16, 20, 22, 24, 26, 31, 41, 98-104 and one or more server network devices 20, 22, 24, 26 communicate with each other and other network devices with near field communications (NFC) and/or machine-to-machine (M2M) communications.

"Near field communication (NFC)" is a set of standards for smartphones and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags 99 and/or sensor.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

An "RFID tag" is an object that can be applied to or incorporated into a product, animal, or person for the purpose of identification and/or tracking using RF signals.

An "RFID sensor" is a device that measures a physical quantity and converts it into an RF signal which can be read by an observer or by an instrument (e.g., target network devices 12, 14, 16, 20, 22, 24, 26, 31, 41, 98-104, server network devices 20, 22, 24, 26, etc.)

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 20, 22, 24, 26, 31, 41, 98-104 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30, 30a, 30b, 30c, 30d provide cloud SaaS 64 services and/or non-cloud application services from television services over the cloud communications network 18 or application services over the non-cloud communications network 18'. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30, 30a, 30b, 30c, 30d provide cloud SaaS 64 services and/or non-cloud application services from Internet television services over the cloud communications network 18 or non-cloud communications network 18' The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30, 30a, 30b, 30c, 30d provide cloud SaaS 64 services and/or non-cloud application services from general search engine services. A search engine is designed to search for information on a cloud communications network 18 or non-cloud communications network 18' such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30a, 30b, 30c, 30d provide cloud SaaS 64 services and/or non-cloud application services from general search engine services. In another embodiment, the cloud applications 30, 30a, 30b, 30c, 30d provide general search engine services by interacting with one or more other public search engines (e.g., GOOGLE, BING, YAHOO, etc.) and/or private search engine services.

In another embodiment, the cloud applications 30, 30a, 30b, 30c, 30d provide cloud SaaS 64 services and/or non-cloud application services from specialized search engine services, such as vertical search engine services by interacting with one or more other public vertical search engines (e.g., GALAXY.COM, etc.) and/or private search engine services.

However, the present invention is not limited to such general and/or vertical search engine services and more, fewer and/or other general search engine services can be used to practice the invention.

Social Networking Services

In one embodiment, the cloud applications 30, 30a, 30b, 30c, 30d provide cloud SaaS 64 services and/or non-cloud application services from one more social networking services including to/from one or more social networking websites (e.g., FACEBOOK, YOUTUBE, TWITTER, INSTAGRAM, etc.). The social networking websites also include, but are not limited to, social couponing sites, dating websites, blogs, RSS feeds, and other types of information websites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 31, 41, 98-104 with wired and/or wireless interfaces of the present invention include one or more of the security and encryptions techniques discussed herein for secure communications on the cloud communications network 18 or non-cloud communications network 18'.

Application programs 58 (FIG. 2) include security and/or encryption application programs integral to and/or separate from the applications 30, 30a, 30b, 30c, 30d. Security and/or encryption programs may also exist in hardware components on the network devices (12, 14, 16, 20, 22, 24, 26, 31, 41, 98-104) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. Another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of a length $<2^{64}$ bits (for SHA-224 and SHA-256 or $<2^{128}$ bits for SHA-384 and SHA-512) is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
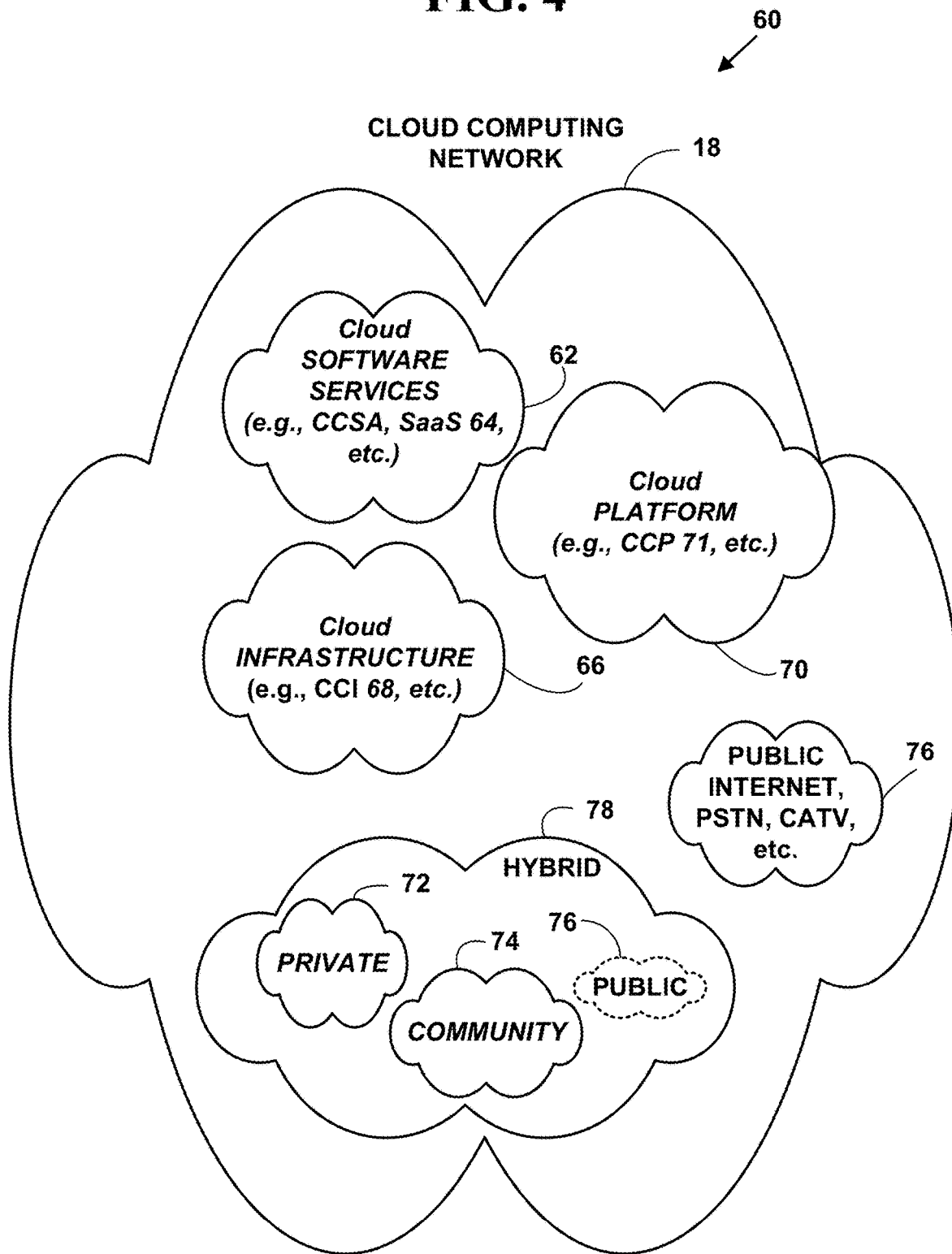
FIG. 4 is block diagram illustrating an exemplary cloud communications network.

FIG. 4 is a block diagram 60 illustrating an exemplary cloud computing network 18. The cloud computing network 18' is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18' includes a cloud communications network 18' comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand Consumable Item Replenishment Service. Automatic consumable item replenishment services can unilaterally provision computing capabilities, such as server time and network storage, as needed automatically without requiring human interaction with each network server on the cloud communications network 18'.
2. Broadband network access. Automatic consumable item replenishment services capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G, 4G and 5G wireless and/or wired and broadband and/or ultra-broad band (e.g., WiMAX, etc.) network access.

TABLE 1-continued

3. Resource pooling. Automatic consumable item services resources are pooled to serve multiple requesters using a multi-tenant model, with different physical and virtual resources dynamically assigned and reassigned according to demand. There is location independence in that a requester of services has no control and/or knowledge over the exact location of the provided by the Consumable Item Replenishment service resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for automatic consumable item replenishment service collaboration. For automatic consumable item replenishment service services, multi-media collaboration converters, the consumable item replenishment services collaboration and analytic conversion capabilities available for provisioning appear to be unlimited and can be used in any quantity at any time.
5. Measured Services. Cloud computing systems automatically control and optimize resource use by leveraging a metering capability at some level of abstraction appropriate to the type of consumable item replenishment services (e.g., storage, processing, bandwidth, custom electronic content retrieval applications, etc.). Electronic consumable item replenishment services collaboration conversion usage is monitored, controlled, and reported providing transparency for both consumable item replenishment service and requester of the utilized consumable item replenishment service.

Exemplary cloud computing service models illustrated in FIG. 4 appear in Table 2. However, the present invention is not limited to these service models and more, fewer or other service models can also be used to practice the invention.

TABLE 2

1. Cloud Computing Software Applications 62 for Consumable Item Replenishment Service (CCSA, SaaS 64). The capability to use the provider's applications 30, 30a, 30b, 30c, 30d running on a cloud infrastructure 66. The cloud computing applications 62, are accessible from the server network device 20 from various client devices 12, 14, 16 through a thin client interface such as a web browser, etc. The user does not manage or control the underlying cloud infrastructure 66 including network, servers, operating systems, storage, or even individual application 30, 30a, 30b, 30c, 30d capabilities, with the possible exception of limited user-specific application configuration settings.
2. Cloud Computing Infrastructure 66 for Consumable Item Replenishment Service (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30a, 30b, 30c, 30d. The user does not manage or control the underlying cloud infrastructure 66 but has control over operating systems, storage, deployed applications, and possibly limited control of select networking components (e.g., host firewalls, etc.).
3. Cloud Computing Platform 70 for Consumable Item Replenishment Service (CCP 71). The capability provided to the user to deploy onto the cloud infrastructure 66 created or acquired applications created using programming languages and tools supported servers 20, 22, 24, 26, etc.. The user does not manage or control the underlying cloud infrastructure 66 including network, servers, operating systems, or storage, but has control over the deployed applications 30a, 30b, 30c, 30d and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network 72. The cloud network infrastructure is operated solely for Consumable Item Replenishment Service. It may be managed by the electronic content retrieval or a third party and may exist on premise or off premise.

TABLE 3-continued

2. Community cloud network 74. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise.
3. Public cloud network 76. The cloud network infrastructure such as the Internet, PSTN, SATV, CATV, Internet TV, etc. is made available to the general public or a large industry group and is owned by one or more organizations selling cloud services.
4. Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for electronic content retrieval takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30, 30a, 30b, 30c, 30d, offers cloud services for consumable item replenishment services. The application 30, 30a, 30b, 30c, 30d offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 64 (SaaS) including a specific cloud software service 64 for Consumable Item Replenishment Service. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
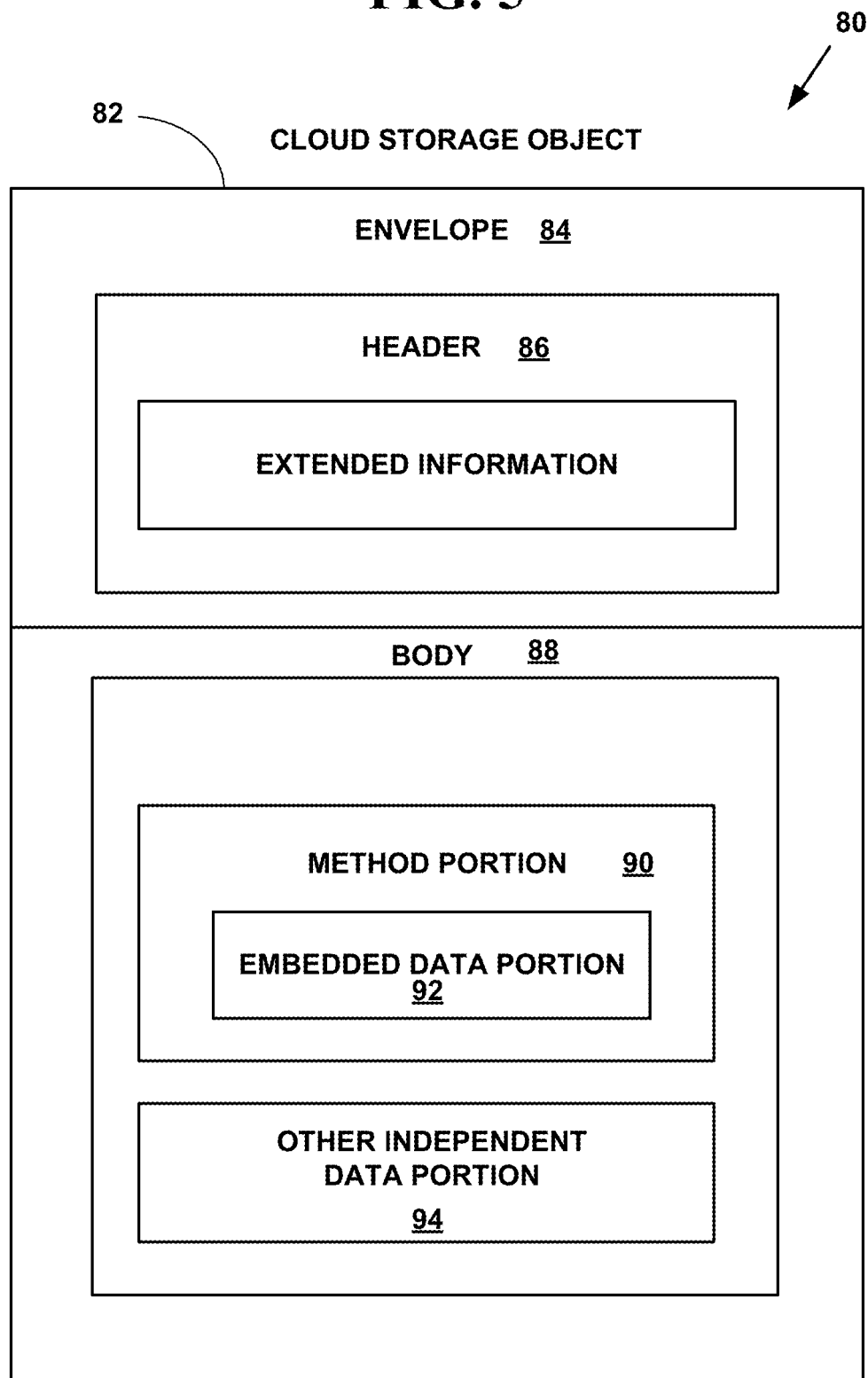
FIG. 5 is a block diagram illustrating an exemplary cloud storage object.

FIG. 5 is a block diagram 80 illustrating an exemplary cloud storage object 82. One or more server network devices (e.g., 20, 22, 24, 26, etc.) store portions 13', 15' of the electronic message content 13, 15 (e.g., replenishment of consumable items messages, etc.) as cloud storage objects 82 (FIG. 5) as is described herein.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30a, 30b, 30c, 30d.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction and provides access to consumable item replenishment services in a cloud or non-cloud environment. In one embodiment, the API for Consumable Item Replenishment Service is available to network devices 12, 14, 16, 20, 22, 24, 26, 31, 98-104 and networks 18, 18'. However, the present invention is not limited to such an embodiment and other embodiments can be used to practice the invention.

Wearable Devices

Wearable technology" and/or "wearable devices" are clothing and accessories incorporating computer and advanced electronic technologies. Wearable network devices provide several advantages including, but not limited to: (1) Quicker access to notifications. Important and/or summary notifications are sent to alert a user to view the whole message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices take telemetric data recordings and providing useful feedback for users for exercise, health, fitness, etc. activities.

Figure 6:
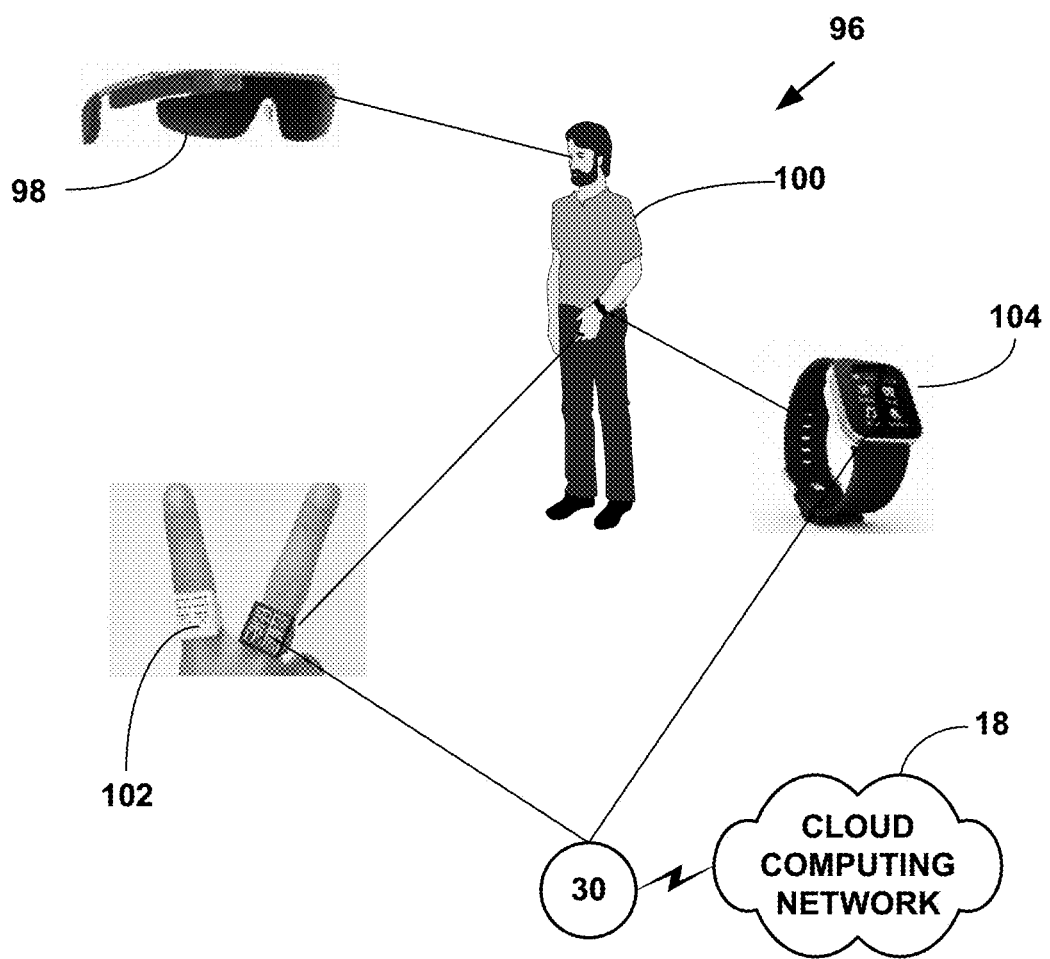
FIG. 6 is a block diagram illustrating wearable network devices.

FIG. 6 is a block diagram with 96 illustrating wearable devices. The wearable devices include one or more processors and include, but are not limited to, wearable digital glasses 98, clothing 100, jewelry 102 (e.g., smart rings, smart earrings, etc.) and/or watches 104. However, the present invention is not limited to such embodiments and more, fewer and other types of wearable devices can also be used to practice the invention.

In one specific embodiment, the application 30, 30a, 30b, 30c, 30d interacts with wearable devices 98-104 for automatic consumable item replenishment services the methods described herein. However, the present invention is not limited to this embodiment and other embodiments can also be used to practice the invention.

Artificial Intelligence (AI) and Big Data

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points.

In one embodiment, the present invention uses one or more AI methods including, but are not limited to, AI knowledge-based methods 30b for automatic (1) Consumable Item Replenishment Services. However, the present invention is not limited to such an embodiment and more, fewer and/or other AI methods can be used to practice the invention.

In one embodiment, SaaS 64 includes and AI application 30b with the AI methods described herein. In another embodiment, the AI application 30b is a standalone application. However, the present invention is not limited to such an embodiment, and the AI application 30b can be provided in other than the SaaS 64.

"Big Data" refers to the use of predictive analytic methods that extract value from data, and to a particular size of data set. The quantities of data used are very large, at least 100,000 data points and more typically 500,000 to 1 Million+data points. Analysis of Big Data sets are used to find new correlations and to spot trends. In one embodiment, SaaS 64 includes and Big Data application 30d with the Big Data described herein.

In one embodiment, the AI methods 30b described herein collect data information to create and store (e.g., in cloud storage object 82, etc.) a Big Data set that is used to analyze trends find new correlations and to spot trends with a Big Data replenish application 30c. However, the present invention is not limited to such an embodiment and the AI methods described herein can be used without Big Data sets.

In one embodiment, SaaS 64 includes and AI application 30b and a Big Data application 30b with the AI methods and Big Data methods described herein. In another embodiment, the AI application 30b and the Big Data applications are standalone applications. However, the present invention is not limited to such an embodiment, and the AI application 30b and/or Big Data application 30c can be provided in other than the SaaS 64.

Short Message Service (SMS) Messaging

Short Message Service (SMS) is an electronic text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies as well as satellite and landline networks.

The SMS Internet Engineering Task Force (IETF) Request for Comments (RFC) 5724, ISSN: 2070-1721, 2010, is incorporated herein by reference.

Rich Communication Services (RCS)

Rich Communication Services (RCS) is a communication protocol between mobile telephone carriers and between phone and carrier, aiming at replacing SMS messages with a text-message system that is richer, provides phonebook polling (e.g., for service discovery), and can transmit in-call multimedia. It is also marketed under the names of Advanced Messaging, Advanced Communications, Chat, joyn, Message+ and SMS+.

One advantage RCS Messaging has over SMS is that RCS enables users to send rich, verified messages including photos, videos and audio messages, group messages, read receipts, indicators to show other users are typing a message, etc.

The GSM Association, Rich Communication Suite RCS API Detailed Requirements, version 3.0, 2017, is incorporated herein by reference. The RCS 3GPP and Open Mobile Alliance (OMA) standard Release 8.0 Version 9.0 (16.05.2018), is incorporated herein by reference.

Consumable Item Replenishment Methods

Figure 7C:
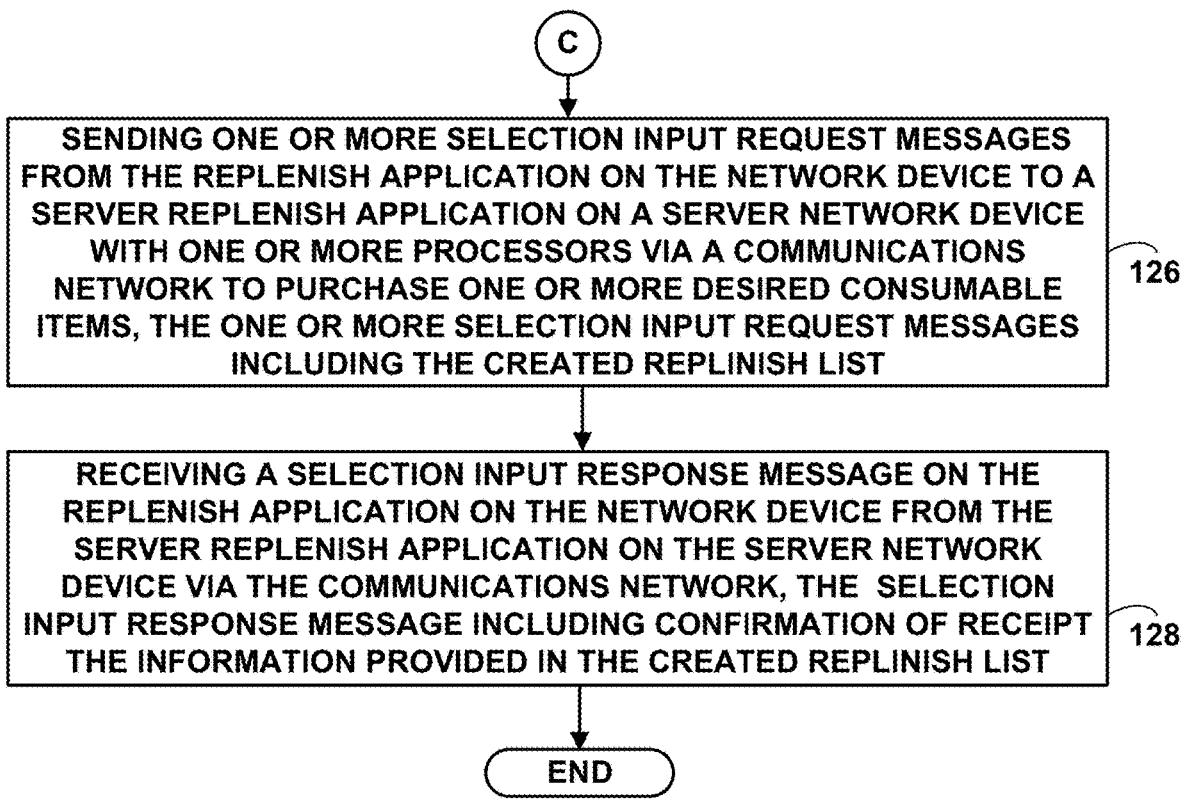

FIGS. 7A, 7B and 7C are a flow diagram illustrating a Method 106 for automatically replenishing consumable items.

In FIG. 7A, at Step 108, one or more product codes for one or more consumable items are scanned with a camera component on a replenish application on a network device with one or more processors. At Step 110, a picture or a graphical image of the one or more desired consumable items corresponding to the scanned one or more product codes is displayed for the one or more desired consumable items on the replenish application on the network device. At Step 112, one or more other pictures or one or more graphical images or an electronic list of other consumable items available from other companies who sell consumable items similar to the one or more consumable items from the scanned one or more product codes is displayed on the replenish application on the network device. At Step 114, a list of electronic coupons is displayed for the one or more desired consumable items on the replenish application on the network device. At Step 116, a list of preferred vendors who can supply the one or more desired consumable items is displayed on the replenish application on the network device. At Step 118, a list of delivery options for the one or more desired consumable items is displayed on the replenish application on the network device. In FIG. 7B at Step 120, a list of electronic payment options to purchase the one or more desired consumable items is displayed on the replenish application on the network device. At Step 122, a list of one or more other network devices each with one or more processors who have permission to view a shared list of the one or more desired consumable items is displayed on the replenish application on the network device. At Step 124, a replenish list for one or more desired consumable items is created including: (1) one or more desired consumable items selected with a scanned product code, (2) any desired consumable items selected from other consumable items available from other companies who sell consumable items similar to the one or more consumable items from the scanned one or more product codes, (3) any electronic coupons selected, (4) one or more preferred vendors from the list of preferred vendors, (5) one or more delivery options from the list of delivery options, (6) one or more electronic payment types, (7) one or more other network devices from the list of other network devices who have permission to view a shared list of the one or more desired consumable items, and (8) automatic replenishment information for the desired consumable items. In FIG. 7C at Step 126, one or more selection input request messages are sent from the replenish application on the network device to a server replenish application on a server network device with one or more processors via a communications network to purchase one or more desired consumable items, the one or more selection input request messages including the created replenish list. At Step 128, a selection input response message is received on the replenish application on the network device from the server replenish application on the server network device via the communications network, the selection input response message including confirmation of receipt the information provided in the created replenish list to initiate ordering and purchasing of the desired consumable items.

The present invention is illustrated with an exemplary embodiment. However, the present invention is not limited to such an embodiment and other embodiments can be used to practice the invention.

In such an exemplary embodiment in FIG. 7A at Step 108, one or more product codes 23 from one or more consumable items 25 are scanned from a replenish application 30 with a camera component 27 on network device 12, 14, 16, 31, 41, 98-104 with one or more processors.

In another embodiment the network device includes a tabletop product code scanner 23 network device 41 with one or more processors. In one embodiment, the tabletop product code scanner 41 includes a camera component. In another embodiment the tabletop product code scanner 41 includes an optical scanning component instead of a camera component. However, the present invention is not limited to such embodiments and other embodiments can be used to practice the invention.

In one embodiment, the one or more desired consumable items 25, are items that are consumed (i.e., used up, etc.) on a regular basis (e.g., daily, weekly, monthly, etc.).

In one embodiment, the one or more desired consumable items 25 included perishable consumable items (e.g., fruits, vegetables, meats, etc.) and non-perishable items (e.g., packaged items, canned items, etc.).

The one or more consumable items 25 includes items consumed in a home environment and include but are not limited to, food items (e.g., groceries, etc.), cleaning supplies (e.g., cleaning fluids, sponges, mops, brooms, etc.), personal grooming supplies (e.g., soap, shampoo, razers, hygiene items, etc.), pet supplies (e.g., dog and cat food, cat litter, etc.), laundry supplies (e.g., soap, dryer sheets, fabric softener, etc.), household items (e.g., batteries, light bulbs, toilet paper, paper towels, etc.), household maintenance supplies (e.g., furnace filters, water filters, etc.), baby supplies (e.g., food, diapers, wipes, etc.) and/or other types of consumable items 25 that are consumed (i.e., used up, etc.) by consumers.

However, the present invention is not limited to the consumable items 25 listed and can be used for other consumable items in other than the home environment including but not limited to, industrial, commercial and/or other consumable item environments.

In one embodiment, a user with a smart speaker 31 uses voice commands to select the desired consumable items 25 instead of scanning in a product code 23 with a camera component 27. In such an embodiment, the user may use the voice command, "Smart speaker, please put regular TIDE laundry detergent, 100 fluid ounces size, from AMAZON, WAL-MART on my replenish list." The replenish application 30 interprets such voice commands from the smart speakers 31. However, the present invention is not limited to such an embodiment and the other embodiments can be used to practice the invention.

In one embodiment, the replenish application 30 includes a parental control security feature. In such an embodiment, the parental control feature prohibits children from ordering any consumable items, allows children to order only certain consumable items, and/or allow children to order any consumable item but includes a review feature that allows a parent to have final approval over which consumable items are actually ordered. However, the present invention is not limited to such embodiments and the other embodiments can be used to practice the invention.

The parental control feature, for example may allow a child to order another quart or milk, but not order one or more cartons of ice cream, packages of candy, cookies, etc.

In another embodiment, the replenish application 30 includes a security control feature for primary and secondary users. The primary user approves all secondary users and a total number of secondary users. However, the present invention is not limited to such embodiments and the other embodiments can be used to practice the invention.

In one embodiment, the one or more product codes 23, include, but are not limited to, barcodes. A "barcode" is an optical machine-readable representation of data, which shows data about the object to which it attaches. Originally, barcodes represented data by varying the widths and spacings of parallel lines, and may be referred to as linear or 1 dimensional (1D). Later they evolved into rectangles, dots, hexagons and other geometric patterns in 2 dimensions (2D). Although 2D systems use a variety of symbols, they are generally referred to as barcodes as well. Barcodes originally were scanned by special-optical scanners called barcode readers. However, barcode scanners and interpretive software are available for use via the camera component 27 on network devices 12, 14, 16, 31, 41, 98-104.

In another embodiment, the one or more product codes 23 include, but are not limited to, other one, two, or three dimensional bar codes.

Table 4 illustrates exemplary linear barcodes, the standards of all of which are incorporated by reference. However, the present invention is not limited to the exemplary linear barcodes listed in Table 4, and more fewer or other linear barcodes can also be used to practice the invention.

TABLE 4

| Linear Bar Codes |
| --- |
| UPC |
| Codabar |
| Code 25 - Non-interleaved 2 of 5 |
| Code 25 - Interleaved 2 of 5 |
| Code 39 |
| Code 93 |
| Code 128 |
| Code 128A |
| Code 128B |
| Code 128C |
| Code 11 |
| CPC Binary |
| DUN 14 |
| EAN 2 |
| EAN 5 |
| EAN 8, EAN 13 |
| Facing Identification Mark |
| GS1-128 (formerly known as UCC/EAN-128), incorrectly referenced as EAN 128 and UCC 128 |
| GS1 DataBar, formerly Reduced Space Symbology (RSS) |
| HIBC (HIBCC Health Industry Bar Code) |
| ITF-14 |
| Latent image barcode |
| Pharmacode |
| Plessey |
| PLANET |
| POSTNET |
| Intelligent Mail barcode |
| MSI |
| PostBar |
| RM4SCC/KIX |
| JAN |
| Telepen |

Table 5 illustrates exemplary matrix (2D) barcodes, the standards of all of which are incorporated by reference. However, the present invention is not limited to the exemplary matrix barcodes listed in Table 5, and more, fewer or other matrix barcodes can also be used to practice the invention.

TABLE 5

Matrix Bar Codes

3-DI
ArrayTag
Aztec Code
Small Aztec Code
Chromatic Alphabet
Codablock
Code 1
Code 16K
Code 49
ColorCode
Compact Matrix Code
CP Code
CyberCode
d-touch
DataGlyphs
Datamatrix
Datastrip Code
Dot Code A
EZcode
Grid Matrix Code
High Capacity Color Barcode
HueCode
INTACTA.CODE
InterCode
JAGTAG
Lorem ipsum
MaxiCode
mCode
MiniCode
MicroPDF417
MMCC
Nintendo e-Reader#Dot code
Optar
PaperDisk
PDF417
PDMark
QR Code
QuickMark Code
SmartCode
Snowflake Code
ShotCode
SPARQCode
SuperCod
Trillcode
UltraCode
UnisCode
VeriCode, VSCode
WaterCode In one embodiment, the one or more product codes 23, include, but are not limited to, Universal Product Codes (UPC). However, the present invention is not limited to this embodiment and other embodiments can be used to practice the invention.

A UPC is a barcode symbology that is widely used in the United States, Canada, Europe, Australia, New Zealand, and other countries for tracking trade items in stores. UPC (technically refers to UPC-A) consists of 12 numeric digits that are uniquely assigned to each trade item. Along with the related European Article Number (EAN) barcode, the UPC is the barcode mainly used for scanning of trade items at the point of sale, per Global Standards One (GS1) specifications. UPC data structures are a component of Global Trade Items (GTINs) and follow the GS1 specification, which is based on international standards. But some retailers (e.g., clothing, furniture) do not use the GS1 system (rather other barcode symbologies or article number systems). On the other hand, some retailers use the EAN/UPC barcode symbology, but without using a GTIN (i.e., for items sold in their own stores only).

In another embodiment, the one or more product codes 23 include, but are not limited to, Quick Response (QR) codes.

A QR code is a type of matrix barcode (or two-dimensional barcode) first designed in 1994. A barcode is a machine-readable optical label that contains information about the item to which it is attached. In practice, QR codes often contain data for a locator, identifier, or tracker that points to a website or application. A QR code uses four standardized encoding modes (numeric, alphanumeric, byte/binary, and kanji) to store data efficiently; extensions may also be used.

In one specific embodiment, the replenish application 30, 64 interacts with a bar code reader application. However, the present invention is not limited to a bar code reader application and other applications can also be used to practice the invention.

The Quick Response system became popular outside the automotive industry due to its fast readability and greater storage capacity compared to standard UPC barcodes. Applications include product tracking, item identification, time tracking, document management, and general marketing.

A QR code consists of black squares arranged in a square grid on a white background, which can be read by an imaging device such as a camera, and processed using Reed-Solomon error correction until the image can be appropriately interpreted. The required data is then extracted from patterns that are present in both horizontal and vertical components of the image.

In one embodiment, the one or more product codes 23, include, but are not limited to, SMART Labels. However, the present invention is not limited to this embodiment and other embodiments can be used to practice the invention.

A SMART label is a label that incorporates technology that extends s functionality and contents of labels or packaging beyond traditional print methods SMART labels come in a variety of forms from RFID tags, to QR codes, NFC and M2M communications, etc.

In one embodiment, replenish application 30 functionality is provided via a cloud SaaS 64 from a cloud server network device 20 on a cloud communications network 18. However, the present invention is not limited to such an embodiment and the other embodiments can be used to practice the invention.

Returning to FIG. 7A at Step 110, a picture 29 or a graphical image 29' of the one or more desired items 25 corresponding to the one or more product codes 23 for the one or more desired consumable items is displayed via the replenish application 30 on a display component 32 on the network device 12, 14, 16, 31, 41, 98-104. The picture 29 and/or graphical image 29' of the one or more desired items 25 provides a visual conformation that the one or more desired consumable items 25 are consumable items actually being replenished. However, the present invention is not limited to these embodiments and other embodiments can be used to practice the invention.

In one embodiment, the smart speaker 31 provides audio information for the one or more desired items 25 corresponding to the one or more product codes 23. For example, the smart speaker 31 says "Regular TIDE laundry detergent, 100 fluid ounces size, from WAL-MART has been added to your replenish list." However, the present invention is not limited to such an embodiment and other embodiments may be used to practice the invention.

The replenish application 30 provides a first option for the order to be fulfilled automatically, or to be stored on a list pending to be filled. A consumer has a first option to have desired consumable items 25 automatically replenished when they are added to the replenish list 37.

The replenish application 30 provides a second option is to have desired consumable items 25 stay in a pending state until the consumer chooses to fulfill the replenish list 37. This pending list of consumable items 25 is shared with other users, and push notification messages (e.g., text, email, voice mail, etc.) sent to others who may be in stores where the desired consumable items 25 cab be purchased on the consumer's behalf, and allow the consumer to reimburse the family, friend, etc. who purchased the desired consumable item 25 for the consumer and/or pay the family, friend, etc. directly with an automatic payment service (e.g., VENMO, PAYPAL, etc.), that has pre-configured to pay for such purchase.

In one embodiment, the server network device 20 includes a list of UPC codes or other item identifiers and a list of item pictures in one or more associated databases 20' on the communication network 18'. In another embodiment, the server network device 20 includes a list of UPC codes or other item identifiers and a list of item pictures in one or more cloud storage objects 82 in one or more associated cloud databases 20' on the cloud communications network 18'. In another embodiment, the server network device 20 includes one or more electronic links to one or more lists of UPC codes or other item identifiers and one or more lists of item pictures to one or more other databases 22', 24', 26' maintained by other server network device 22, 24, 26 on the communications network. However, the present invention is not limited to these embodiments and other embodiments can be used to practice the invention.

At Step 112, one or more other pictures or one or more graphical images or an electronic list of other consumable items available from other companies who sell consumable items 35 similar to the one or more desired consumable items 25 from the scanned one or more product codes are displayed on the replenish application 30 on the network device 12, 14, 16, 31, 41, 98-104.

In one embodiment, the smart speaker 31 provides audio information for other consumable items available from other companies who sell consumable items 35 similar to the one or more desired consumable items 25 from the scanned one or more product codes. For example, the smart speaker 31 says "You requested TIDE laundry detergent. ALL and GAIN laundry detergent is also available." However, the present invention is not limited to such an embodiment and other embodiments may be used to practice the invention.

In another embodiment, an order for the one or more other pictures or one or more graphical images or an electronic list of other consumable items available from other companies who sell consumable items 35 similar to the one or more desired consumable items 25 from the scanned one or more product codes 23 are displayed on the replenish application 30 on the network device 12, 14, 16, 31, 41, 98-104 are displayed are done based on a subscription service sold to other companies who sell consumable items 35 similar to the one or more desired consumable items 25 from the scanned one or more product codes.

For example, if a user scans in a product code 23 for laundry detergent A, then other companies who sell laundry detergent brand B, brand C, brand C, etc. can subscribe to the subscription service to offer pictures or graphical images for their own brands to attempt to persuade a consumer to buy another brand then the scanned in brand A and change what has been added to a replenish list 37.

In another embodiment, the subscription service includes a priority display order of pictures, graphical images or lists displayed for a consumer. For examples, a first display position is a top priority or number one position in a priority scheme. For example, the company who sells laundry detergent for brand C buys the top priority spot, the number one display spot for laundry detergent, etc. Another company who sells laundry detergent for brand D may desire to buy the $2^{nd}$ display priority spot for laundry detergent instead of the $1^{st}$ display spot to save money, etc. However, the present is not limited to such an embodiment and other embodiments, with or without a priority placement of coupons can be used to practice the invention.

In one embodiment, the priority display order includes a dynamic bidding system in which the priority display orders from one-to-X, where X is a desired number greater than one are automatically and dynamically determined by the server replenish application 30a on the server network device 20 in real-time based on which a server network device 22, 24, 26 for a company bids a highest price and automatically pays an electronic payment via the communications network 18 for a desired priority display spot. However, the present invention is not limited to such an embodiment and other embodiments with other priority methods, with and/or without priority bidding can be used to practice the invention.

In another embodiment, the replenish application 30a on the server network device 20 takes the replenish list 37 and sends it out for "reverse auctions" to plural vendor server network devices 22, 24, 26 via the communications network 18, 18'. For example, if the replenish list 37 includes desired consumable items 25 comprising milk, bread, butter, and ground beef, the replenish application 30a on the server network device 20 will collect pricing of these items at different vendors and also collect methods to purchase, pick-up, delivery and/or ship the desired consumable items 25 and provide display of the pricing from lowest to highest, purchase and delivery options of these items on the replenish application 30 on the network device 12, 14, 16, 31, 41, 98-104. The replenish application 30 on the network device 12, 14, 16, 31, 41, 98-104 selects a desired vendor based on desired pricing and purchase and delivery options selected by a consumer.

In one embodiment, the replenish application 30 uses automatic reverse auction bidding to automatically select and purchase desired consumable items 25 on the replenish list 37 from a vendor who bids a lowest price and matches purchase options and delivery options setup by a consumer. Rather than a consumer choosing one or more vendors who can supply a desired consumable item 25 based on pricing, purchase and delivery options, the one or more vendors bid to automatically supply selected consumable items 25 on the replenish list 37 based on pre-determined preferences set by the consumer on the replenish application 30 on the network device 12, 14, 16, 31, 41, 98-104.

For example, if milk was a desired consumable item 25 on the replenish list 37, and the consumer set-up a preference for purchasing milk at a lowest price for home delivery of the milk, vendors A, B and C bid to have the consumer automatically purchase the milk from one of them at a lowest price and these vendors all can provide home delivery of the milk for the consumer. However, even though vendor D can provide the milk to the consumer at lower price than vendors A, B, or C, vendor D does not, provide home delivery of the milk, so vendor D would not win the reverse auction and not be allowed to automatically provide the milk to the consumer. In another example, Vendor B can provide the milk at a lowest: price but the consumer desires to purchase the milk via PAYPAL. However Vendor B does not use PAYPAL, for purchases, so Vendor B is not allowed to automatically provide the milk for the consumer.

However, the present invention is not limited to such embodiments and other embodiments and types of reverse auctions can be used to practice the invention.

In another embodiment, the replenish application 30 on the network device 12, 14, 16, 31, 41, 98-104 sends out replenish list 37 for reverse auctions or automatic reverse auctions to plural other vendor server network devices via the communications network 18, 18'. However, the present invention is not limited to such an embodiment and other embodiments with other priority methods, with and/or without priority bidding can be used to practice the invention.

At Step 114, a list of electronic coupons 33 for the one or more desired consumable items 25 is displayed on the replenish application 30 on the network device 12, 14, 16, 31, 41, 98-104.

In one embodiment, the list of electronic coupons 33 is dynamically obtained by the replenish application 30 on the network device 12, 14, 16, 31, 41, 98-104 by making one or more queries to other server network devices via the communications network 18, 18' for companies who provide the desired consumable products 25 and/or electronic coupon provider sites (e.g., RAKUTEN, GROUPON, etc.)

In another embodiment, the list of electronic coupons 33 is dynamically obtained by the replenish application 30 on the network device 12, 14, 16, 31, 41, 98-104 from the server replenish application 30*a* on the server network device 20, 22, 24, 26. In such an embodiment, the list of electronic coupons 33 is dynamically obtained by the replenish application 30 on the network device 12, 14, 16, 31, 41, 98-104 from one or more databases 20', 22', 24' 26' associated with the server network devices 20, 22, 24, 26. In another embodiment, the list of electronic coupons 33 is dynamically obtained by the replenish application 30 on the network device 12, 14, 16, 31, 41, 98-104 from one or more cloud storage objects 82 associated with the server network devices 20, 22, 24, 26 with one or more SaaS 64 cloud services. However, the present invention is not limited to these embodiment, and other embodiments can be used to practice the invention.

In one embodiment, the list of electronic coupons includes only coupons for the one or more desired consumable items 25 from the scanned one or more product codes 23.

In another embodiment, the list of electronic coupons 33 also include coupons from other companies who sell consumable items 35 similar to the one or more desired consumable items 25 from the scanned one or more product codes are displayed on the replenish application 30 on the network device 12, 14, 16, 31, 41, 98-104. Such electronic coupons attempt to persuade a consumer to buy another brand then the scanned in brand. For example, if the user wanted to purchase TIDE laundry detergent, then a coupon for ALL laundry detergent may be displayed with a $2.00 off sale price coupon, etc. However, the present invention is not limited to this embodiment and other embodiments may be used to practice the invention.

In another embodiment, an order of electronic coupons 33 displayed are done based on a subscription service sold to other companies who sell consumable items 35 similar to the one or more desired consumable items 25 from the scanned one or more product codes. For example, if a user scans in a product code 23 for laundry detergent A, then other companies who sell laundry detergent brand B, brand C, brand C, etc. can subscribe to the subscription service to offer electronic coupons for their own brands to attempt to persuade a consumer to buy another brand then the scanned in brand A.

In another embodiment, the subscription service includes a priority placement of coupons displayed for a consumer. For example, the company who sells laundry detergent for brand C buys the top priority spot for laundry detergent coupons, etc. However, the present is not limited to such an embodiment and other embodiments, with or without a priority placement of coupons can be used to practice the invention.

In one embodiment, the priority display order of electronic coupons 33 includes a dynamic bidding system in which the priority coupon display orders from one-to-X, where X is a desired number greater than one are automatically and dynamically determined by the server replenish application 30*a* on the server network device in real-time based on which a server network device 22, 24, 26 for a company bids a highest price and automatically pays an electronic payment via the communications network 18 for a desired priority display spot. However, the present invention is not limited to such an embodiment and other embodiments with other priority methods, with and/or without priority bidding can be used to practice the invention.

In another embodiment, the replenish application 30*a* on the server network device 20 and/or the replenish application 30 on the network device 12, 14, 16, 31, 41, 98-104 takes the replenish list 37 and sends it out for reverse auctions or automatic reverse auctions to plural vendor server network devices 22, 24, 26 who provide electronic coupons 33 via the communications network 18, 18'. However, the present invention is not limited to such embodiments and other embodiments can be used to practice the inventions.

At Step 116, a list of preferred vendors who can supply the one or more desired items 25 on the display component 32 is displayed via the replenish application 30 on the network device 12, 14, 16, 31, 41, 98-104.

In one embodiment, the user selects one or more different preferred vendors who can supply the desired consumable items. For example, the user may select a preferred grocery store to provide food items, a preferred department store to provide personal grooming supplies, a preferred pet store to provide pet supply items, etc. In another embodiment, the user selects a single vendor to provide all desired consumable items. However, the present invention is not limited to these embodiments and other embodiments can be used to practice the invention.

In one embodiment, the list of preferred vendors includes prices of the desired consumable items so a user can conduct a price comparison of all available consumable items 25 from all preferred vendors. However, the present invention is not limited to these embodiments and other embodiments can be used to practice the invention.

In another embodiment, any preferred vendors displayed are done based on a subscription service sold to other companies who sell consumable items 35 similar to the one or more desired consumable items 25 from the scanned one or more product codes. In another embodiment, the subscription service includes a priority placement of preferred vendors displayed for a consumer. However, the present invention is not limited to these embodiments and other embodiments can be used to practice the invention.

In one embodiment, the priority display order of vendors includes a dynamic bidding system in which the priority display orders from one-to-X, where X is a desired number greater than one are automatically and dynamically determined by the server replenish application 30*a* on the server network device in real-time based on which a server network device 22, 24, 26 for a company bids a highest price and automatically pays an electronic payment via the communications network 18 for a desired priority display spot. However, the present invention is not limited to such an embodiment and other embodiments with other priority methods, with and/or without priority bidding can be used to practice the invention.

In another embodiment, the replenish application 30a on the server network device 20 and/or the replenish application 30 on the network device 12, 14, 16, 31, 41, 98-104 takes the replenish list 37 and sends it out for reverse auctions or automatic reverse auctions to plural vendor server network devices 22, 24, 26 who provide desired consumable items 25 via the communications network 18, 18'. However, the present invention is not limited to such embodiments and other embodiments can be used to practice the inventions.

At Step 118, a list of delivery options for the one or more desired consumable items 25 is displayed via the replenish application 30 on the network device 12, 14, 16, 31, 41, 98-104.

The delivery options include, but not limited to: (1) having a consumer collect the consumable items themselves and place in a physical cart or basket and purchase them directly in a store using a replenish list 37 automatically created by scanning in product codes 23 for the one or more desired consumable items 25. The replenish list 37 is usable from network device 12, 14, 16, 31, 41, 98-104; (2) call ahead or order ahead online at one or more stores and have a store employees collect the order and the consumer will pick up the consumable items at one or more stores in a drive through pick-up lane, in a store locker, etc.; (3) call ahead or order ahead online at one or more stores and have a store employees collect the order and the consumer will pick up the consumable items at one or more stores with a contactless pick-up where the consumer does not come in contact with store employees; (4) call ahead or order online and have the desired consumable items 25 delivered by a delivery service; and (5) the consumers will choose to order online, using any of the aforementioned delivery options listed above.

In another embodiment, the delivery options displayed are done based on a subscription service sold to other companies who have delivery services that can deliver the one or more desired consumable items 25 from the scanned one or more product codes directly to the consumer. In another embodiment, the subscription service includes a priority placement of preferred delivery service vendors displayed for a consumer. However, the present invention is not limited to these embodiments and other embodiments can be used to practice the invention In another embodiment, the replenish application 30a on the server network device 20 and/or the replenish application 30 on the network device 12, 14, 16, 31, 41, 98-104 takes the replenish list 37 and semis it out for reverse auctions or automatic reverse auction to plural vendor server network devices 22, 24, 26 who provide delivery services via, the communications network 18, 18'. However, the present invention is not limited to such embodiments and other embodiments can be used to practice the inventions.

In FIG. 7B at Step 120, a list of electronic payment options to purchase the one or more desired consumable items is displayed via the replenish application 30 on the network device 12, 14, 16, 31, 98-104.

In one embodiment, the electronic payment information includes, but, is not limited to, credit card, debit card, electronic check, electronic funds transfer and/or payment service information (e.g., PAYPAL, APPLE PAY, CHASE PAY. VENMO, etc.) and/or any combination thereof. For example, a consumer may desire to pay for groceries with a debit card and pay for other items with a credit card, etc. However, the present invention is not limited to these embodiments and other embodiments can be used to practice the invention.

At Step 122, a list of one or more other network devices each with one or more processors who have permission to view a shared list 39 of the one or more desired consumable items 25 is displayed via the replenish application on the network device.

In one embodiment, the shared list 39 information includes, but is not limited to, a list of items that can be shared with family, relatives, friends, neighbors, etc. In such an embodiment, the shared list 39 information is accessible by family, relatives, friends, neighbors either publicly and/or privately on social media accounts (e.g., FACEBOOK, PINTEREST, INSTAGRAM, etc.) and/or other types of electronic accounts. In such an embodiment, the shared lists 39 are used to assist family, relatives, friends, neighbors, etc. For example, if a user was going to the store and an elderly relative or a new mother with baby needed food items that were on a shared list 39, the user could shop for the elderly relative or new item. In one embodiment, the shared list information includes a preferred type of electronic payment (e.g., PAYPAL, VENMO, etc.) for purchasing the consumable items on the shared list for others. However, the present invention is not limited to these embodiments and other embodiments can be used to practice the invention.

In one embodiment, the shared list 39 information includes, but is not limited to, specific digital wallet shared payment services (e.g., VENMO, etc.) that allow users to make and share payments with friends, relative, family, neighbors, ect. However, the present invention is not limited to these embodiments and other embodiments can be used to practice the invention.

In one embodiment, the shard list 39 includes a social media ecosystem with one or more social communities. For example, communities are grouped into two (1) a 1st level "Family" Community (e.g., consumer, spouse, Child 1, Child 2, Mother, Father, Sister, Brother, etc.)—primarily those individuals residing in the residence; (2) a 2nd level "Friends" Community—for any desired individuals living outside the residence (e.g., friends, neighbors, other relatives (e.g., cousins, etc.)). However, the present invention is not limited to such an embodiment, and more, fewer and other types of communities can be used to practice the invention.

In one embodiment, an administrator(s) creates profiles for each individual in their community and assigns permission levels from the replenish application 30 on the network device 12, 14, 16, 31, 98-104.

Full Permission includes a right to create a re-order event including placing consumable items 25 onto the created replenish list, placing consumable items 25 into an online shopping cart, making replenishment purchase, etc.

Partial Permission includes and requires a confirmation by the administrator(s) prior to consumable items being placing item onto the created replenish list 37, placing item into an online shopping cart, making replenishment purchase, etc.

When a partial permission community member (i.e., child) requests consumable items 25 be added to the created replenish list 37, the replenish application 30 on the network device 12, 14, 16, 31, 98-104 sends a prompt, push notification, message (e.g., text message, email message, voice mail message, etc.) to the Administrator asking them to approve or deny all requests.

In one embodiment, the replenish application 30 on the network device 12, 14, 16, 31, 98-104 catalogues the various requests from partial permission community members into a proposed shopping list which they can review at a later time and grant or deny permission to add to created replenish list 37. However, the present invention is not limited to such an embodiment and other embodiments can be used to practice the invention.

At Step 124, a replenish list 37 is created for one or more desired consumable items including, but not limited to: creating a replenish list 37 for one or more desired consumable items including: (1) one or more desired consumable items 25 selected with a scanned product code 23, (2) any desired consumable items selected from other consumable items available from other companies who sell consumable items similar to the one or more consumable items from the scanned one or more product codes, (3) any electronic coupons 33 selected, (4) one or more preferred vendors from the list of preferred vendors, (5) one or more delivery options from the list of delivery options, (6) one or more electronic payment types, (7) one or more other network devices from the list of other network devices who have permission to view a shared list 39 of the one or more desired consumable items to initiate ordering and purchasing of the desired consumable items 25, and (8) automatic replenishment information for the desired consumable items. In one embodiment, the replenish list 37 includes all information (1) through (8). In another embodiment, the replenish list 37 includes only selected ones of the information from (1) through (8). However, the present invention is not limited to such embodiments, and more fewer and/or other items in the replenish list 37 can be used to practice the invention.

The replenish list 37 is usable directly from network device 12, 14, 16, 31, 98-104 used by the consumer. The replenish list 37 is usable for direct in-person shopping and for phone or on-line ordering.

In one embodiment items displayed for a consumer on network devices 12, 14, 16, 31, 98-104 from the replenish list 37 are selectable from replenish application 30. For example, consumer A may desire to see only the one or more desired consumable items 25 selected with a scanned product code 23, consumer B may desire to see the one or more desired consumable items 25 selected with a scanned product code 23 and the electronic coupons, consumer C may desire to see the one or more desired consumable items 25 selected with a scanned product code 23 and the shared list 39, etc.

However, the present invention is not limited to such embodiments, and more fewer and/or other items can be displayed in the replenish list 37 and used to practice the invention.

In one embodiment, the replenish list 37 includes automatic replenish information. The automatic replenish information includes, but is not limited to, replenish frequency information for one or more selected desired consumable items 25. This information is used to automatically order the desired consumable items 25 based on the desired use frequency. For example, the replenish frequency information for a case of water may be weekly, for a bottle of laundry detergent every two weeks, etc. However, the present invention is not limited to these embodiments and other embodiments can be used to practice the invention.

In another embodiment, automatic replenishment information on the replenish list 37 for desired consumable items 25 is saved on one or more server replenish applications 30$a$ on one or more vendor server network devices 20, 22, 24, 26 in one or more associated databases 20', 22', 24', 26'. Such desired consumable items 25 are automatically purchased, made available for pick-up and/or shipped and/or delivered directly to a desired physical location (e.g., home, office, etc.) for a consumer.

In one embodiment, the replenish list 37 further includes automatic replenish information added to the replenish list 37 by the replenish application 30 on the network device 12, 14, 16, 31, 98-104 based on a pre-determined time period required to use a selected desired consumable item. The pre-determined time period is manually determined from the replenish application 30 on the network device 12, 14, 16, 31, 98-104 by the consumer using the network device. However, the present invention is not limited to such an embodiment and other embodiments can be used to practice the invention.

In one embodiment, the automatic replenish information for the replenish list 37 is automatically determined with the server replenish application 30$a$ using AI and/or using Big Data on an AI application 30$b$ and/or Big Data application 30$c$ on a server network device 20, 22, 24, 26. However, the present invention is not limited to such an embodiment and other embodiments, with and/or without AI and/or Big Data can be used to practice the invention.

In one embodiment, the shared list 39 includes all of the desired consumable items 25 on the replenish list 37. In another embodiment, the shared list 39 includes only selected ones of the desired consumable items 25 from the replenish list 37. For example, a consumer may desire to buy personal items (e.g., condoms, feminine hygiene, pregnancy test, cream for a rash, etc.) that they do not want displayed on their shared list 39 because they may cause embarrassment to the consumer.

In one embodiment the replenish list 37 creates a household inventory list of desired consumable items 25. The household inventory is used for daily meal planning. However, the present invention is not limited to such an embodiment and other embodiments can be used to practice the invention.

In one embodiment, the replenish application 30 on the network device 12, 14, 16, 31, 98-104 provides an option of creating and printing or loading into an online or mobile application both a recipe and/or ingredient list of desired consumable items for meal planning.

The replenish application 30 on the network device 12, 14, 16, 31, 98-104 provides automatic upload of ingredient barcodes into the created replenish lists 37, or other online shopping carts, etc. to facilitate purchasing of food items required to prepare a desired meal.

Similar to standard replenishment, the replenish application 30 on the network device 12, 14, 16, 31, 98-104 searches for available electronic coupons 33 and/or other promotions, allow the consumer to select a specific vendor to purchase items, etc. for the desired meal.

The replenish application 30 on the network device 12, 14, 16, 31, 98-104 compares required desired meal ingredients with existing inventory of food items allowing only those meals to be active for selection which the consumer has all the needed ingredients to prepare the desired meal. This is similar to the process by which restaurants decide on and prepare daily specials based on the available on-hand ingredients. This functionality is called "Daily Specials" in the replenish application 30.

The replenish application 30 on the network device 12, 14, 16, 31, 98-104 allows a consumer to see meals where they have only a percentage (i.e., less than 100%) of necessary ingredients for consumable items 25 and then remaining needed ingredients are added to the created replenish list 37, other on-line shopping carts, etc.

The replenish application 30 on the network device 12, 14, 16, 31, 98-104 recommends specific ingredient brands and/or products for consumable items 25 to replace a suggested brand of ingredient and/or products with other ingredient brands and/or products for desired consumable items 25. For example, if the desired meal plan required peanut butter and the UPC code provided on the ingredient list was for PETER PAN brand, replenish application 30 and/or the server replenish application 30a includes a stored history of consumer preferences of JIFF brand and allow and/or automatically replace with their preferred consumable item 25 brand.

In one embodiment, the replenish application 30 on the network device 12, 14, 16, 31, 98-104 automatically associates meal planning to specific product codes and removes a generic nature of an ingredient list and/or product list to specific products and/or specific brands. For example, a recipe for a desired meal and associated created replenish list no longer lists the generic terms salt and butter but now calls out LAND O'LAKES butter and MORTON salt, etc.

In one embodiment, the generic terms are automatically replaced with specific products based on subscription service with a priority replacement system. However, the present invention is not limited to such an embodiment and other embodiments with other priority methods, with and/or without priority bidding can be used to practice the invention.

In one embodiment, the priority display order includes a dynamic bidding system in which the priority replacement terms from one-to-X, where X is a desired number greater than one are automatically and dynamically determined by the server replenish application 30a on the server network device in real-time based on which a server network device 22, 24, 26 for a company bids a highest price and automatically pays an electronic payment via the communications network 18 for a desired priority replacement spot. In one embodiment, the bidding is done on a weekly, bi-weekly, monthly and/or quarterly basis to own these generic terms based on how much a company bids.

However, the present invention is not limited to such embodiments and other embodiments with other priority methods, without priority methods and/or with and/or without priority bidding can be used to practice the invention.

In another embodiment, the replenish application 30a on the server network device 20 and/or the replenish application 30 on the network device 12, 14, 16, 31, 41, 98-104 takes the replenish list 37 and sends it out for reverse auctions to plural vendor server network devices 22, 24, 26 for generic product terms via the communications network 18, 18'. However, the present invention is not limited to such embodiments and other embodiments can be used to practice the inventions.

In one embodiment, the replenish application 30 on the network device 12, 14, 16, 31, 41, 98-104 displays a near empty or empty status for consumable items in the household inventory so such items can be re-ordered. However, the present invention is not limited to such an embodiment and other embodiments can be used to practice the invention.

In FIG. 7C at Step 126, one or more selection input request messages 13a are sent from the replenish application 30 on the network device 12, 14, 16, 31, 41 98-104 to a server replenish application 30a on a server network device 20, 22, 24, 26 with one or more processors via a communications network 18, 18' to purchase one or more desired consumable items, the one or more selection input request messages 13a including the created replenish list 37.

In one embodiment, the one or more selection input request messages 13a are stored in one or more cloud storage objects 13/82 on a cloud communications network 18. However, the present invention is not limited to such an embodiment and the other embodiments can be used to practice the invention without a cloud communications network 18.

In one embodiment, the one or more selection input request messages 13a include, but are not limited to an electronic text message (e.g., SMS, RCS, etc.), an e-mail message, an audio message, a video message and/or other type of message. However, the present invention is not limited to such an embodiment and the other embodiments can be used to practice the invention.

At Step 128, a selection input response message 13b is received on the replenish application 30 on the network device 12, 14, 16, 31, 41, 98-104 from the server network device 20, 22, 24, 26 via the communications network 18, 18'. The selection input response message 13b including confirmation of consumable items ordered from the created replenish list 37.

In one embodiment, the selection input response message 13b includes an electronic text message (e.g., SMS, RCS, etc.), an e-mail message, an audio message, a video message and/or other type of message. However, the present invention is not limited to such an embodiment and the other embodiments can be used to practice the invention.

In one embodiment, the selection input response messages 13b are stored in one or more cloud storage objects 13/82 on a cloud communications network 18'. However, the present invention is not limited to such an embodiment and the other embodiments can be used to practice the invention.

In one embodiment, the created replenish list 37 is stored on the replenish application 30 on the network device 12, 14, 16, 31, 41, 98-104. However, the present invention is not limited to such an embodiment and the other embodiments can be used to practice the invention.

FIG. 8 is a flow diagram illustrating a Method 130 for automatically replenishing consumable items.

In FIG. 8 at Step 132, a server network device with one or more processors receives one or more selection input request messages on a server replenish application on a server network device from a replenish application on a network device with one or more processors via a communications network. The selection input request message includes, the created replenish list, including, but is not limited to: (1) one or more desired consumable items selected with a scanned product code, (2) any desired consumable items selected from other consumable items available from other companies who sell consumable items similar to the one or more consumable items from the scanned one or more product codes, (3) any electronic coupons selected, (4) one or more preferred vendors from the list of preferred vendors, (5) one or more delivery options from the list of delivery options, (6) one or more electronic payment types, and (7) one or more other network devices from the list of other network devices who have permission to view a shared list of the one or more desired consumable items. At Step 134, the server replenish application on the server network device stores created replenish list information from the one or more selection input request messages in one or more databases associated with server network device. At Step 136, the server replenish application on the server network device initiates automatic ordering, automatic electronic payment and automatic selection of delivery options for the one or more desired consumable items from the one or more preferred vendors by sending one or more sale request messages to one or more other server network devices each with one or more processors for the one or one more preferred vendors via the communications network. At Step 138, the server replenish application on server network device receives one or more sale response messages from the one or more other server network devices for the one or more preferred vendors confirming orders, electronic payment and delivery options of the one or more desired consumable items. At Step 140, the server replenish application on the server network device sends a selection input response message to the replenish application on the network device via the communications network. The selection input response message including confirmation of consumable items ordered from which preferred vendors, delivery preferences and storing of shared list preferences.

The present invention is illustrated with an exemplary embodiment. However, the present invention is not limited to such an embodiment and other embodiments can be used to practice the invention.

In such an exemplary embodiment in FIG. 8 at Step 132, a server network device 20, 22, 24, 26 with one or more processors receives one or more selection input request messages 13a on a server replenish application 30a from a replenish application 30 on a network device 12, 14, 16, 31, 41, 98-104 with one or more processors via a communications network 18, 18'. The selection input request message 13 includes, the created replenish list 37, but is not limited to: (1) one or more desired consumable items selected with a scanned product code, (2) any desired consumable items selected from other consumable items available from other companies who sell consumable items similar to the one or more consumable items from the scanned one or more product codes, (3) any electronic coupons selected, (4) one or more preferred vendors from the list of preferred vendors, (5) one or more delivery options from the list of delivery options, (6) one or more electronic payment types, and (7) one or more other network devices from the list of other network devices who have permission to view a shared list of the one or more desired consumable items. However, the present invention is not limited to these embodiments and other embodiments can be used to practice the invention.

In one embodiment, the created replenish list 37 includes automatic replenishment information and Method 130 processes and stores automatic replenishment information. However, the present invention is not limited to such an embodiment and other embodiments may be used to practice the invention.

In one embodiment, the selection input request message 13a includes an electronic text message (e.g., SMS, RCS, etc.), an e-mail message, an audio message, a video message and/or other type of message. However, the present invention is not limited to such an embodiment and the other embodiments can be used to practice the invention.

In one embodiment, the server replenish application 30a is provided as a SaaS 64 on a cloud communications network 18. However, the present invention is not limited to these embodiments and other embodiments can be used to practice the invention.

In one embodiment, server network device 20 further includes an Artificial Intelligence (AI) replenish application 30b, a Big Data replenish application 30c and/or other application 30d. Such applications are used to spot, record and use consumer trends to improve the replenish methods. However, the present invention is not limited to these embodiments and other embodiments can be used to practice the invention.

In one embodiment, the Artificial Intelligence (AI) replenish application 30b, a Big Data replenish application 30c and/or other replenish application 30d are provided as a SaaS 64 on a cloud communications network 18. However, the present invention is not limited to these embodiments and other embodiments can be used to practice the invention.

At Step 134, the server replenish application 30a on the server network device (e.g., server 20, etc.) stores created replenish list 37 information from the selection input request message in one or more databases 20' associated with server network device 20, 22, 24, 26.

In one embodiment, the server replenish application 30a on the server network device 20, 22, 24, 26 stores created replenish list 37 information from the selection input request message in one or more cloud storage objects 13a/82 on a cloud communications network 18. However, the present invention is not limited to these embodiments and other embodiments can be used to practice the invention.

At Step 136, the server replenish application 30a on the server network device 20 initiates automatic ordering, automatic electronic payment and automatic selection of delivery options for the one or more desired consumable items 23 from the one or more preferred vendors by sending one or more sale request messages 13s-req to one or more other server network devices 22, 24, 26 each with one or more processors for the one or one more preferred vendors via the communications network 18, 18.

At Step 138, the server replenish application 30a on server network device 20 receives one or more sale response messages 13s-res from the one or more other server network devices 22, 22, 26 for the one or more preferred vendors confirming orders, electronic payment and delivery options of the one or more desired consumable items.

At Step 140, the server replenish application 30b on the server network device 20 sends a selection input response message 13b to the replenish application 30 on the network device 12, 14, 16, 31, 41, 98-104 via the communications network 18, 18'. The selection input response message including confirmation of consumable items ordered from which preferred vendors, delivery preferences, storing of automatic replenish preferences and storing of shared list preferences.

FIG. 9 is a flow diagram illustrating a Method 142 for automatically replenishing consumable items. At Step 144, a server replenish application on a server network device with one or more processors conducts a test to determine if any consumable items need to be automatically replenished at a current day and time. If at the test at Step 144, there are any consumable items that need to be automatically replenished at the current date and time, at Step 146 the server replenish application on the server network device initiates automatic ordering, automatic electronic payment and automatic selection of delivery options for the one or more desired consumable items from the one or more preferred vendors by sending one or more sale request messages to one or more other server network devices each with one or more processors for the one or one more preferred vendors via the communications network. At Step 148, the server replenish application on server network device receives one or more sale response messages from the one or more other server network devices for the one or more preferred vendors confirming orders, electronic payment and delivery options of the one or more desired consumable items. At Step 150, the server replenish application on the server network device sends a selection input response message to the replenish application on the network device via the communications network. The selection input response message including confirmation of consumable items ordered from which preferred vendors, delivery preferences, storing of automatic replenish preferences and storing of shared list preferences.

The present invention is illustrated with an exemplary embodiment. However, the present invention is not limited to such an embodiment and other embodiments can be used to practice the invention.

In such an exemplary embodiment in FIG. 9 at Step 132, a server replenish application 30*a* on a server network device 20 with one or more processors conducts a test to determine if any consumable items 25 need to be automatically replenished at a current day and time.

In one embodiment, the server replenish application 30*a* on a server network device 20 uses information stored (e.g., FIG. 8, Method 130, Step 134, etc.) in one or more associated databases 20' and/or cloud storage objects 13/82 in one or more associated cloud databases 20' from plural selection input request messages 13*a* that were previously received from one or more network devices 12, 14, 16, 31, 98-104. However, the present invention is not limited to these embodiments and other embodiments can be used to practice the invention.

In another embodiment, the server replenish application 30*a* on a server network device 20 uses information from a current selection input request message 13*a* to initiates automatic ordering, automatic electronic payment and automatic selection of delivery options for the one or more desired consumable items 25 from the one or more preferred vendors but at a current day and time that is later than the current day and time at which a current selection input request message 13*a* was received. For example, the server replenish application 30*a* receives a selection input request message 13*a* at 1:00 pm and July 11 and the selection input request message 13*a* includes information that indicates the automatic ordering, etc. is to take place at 4:00 pm on July 11, so a consumer can pick up his/her order after leaving work, etc. However, the present invention is not limited to these embodiments and other embodiments can be used to practice the invention.

If at the test at Step 144 there are any consumable items that need to be automatically replenished at the current date and time, at Step 146, the server replenish application 30*a* on the server network device 20 initiates automatic ordering, automatic electronic payment and automatic selection of delivery options for the one or more desired consumable items 25 from the one or more preferred vendors by sending one or more sale request messages 13*s*-req to one or more other server network devices 22, 24, 26 each with one or more processors for the one or one more preferred vendors via the communications network 18, 18'.

At Step 148, the server replenish application 30*a* on server network device 20 receives one or more sale response messages 13*s*-res from the one or more other server network devices 22, 22, 26 for the one or more preferred vendors confirming orders, electronic payment and delivery options of the one or more desired consumable items.

At Step 150, the server replenish application 30*b* on the server network device 20 sends a selection input response message 13*b* to the replenish application 30 on the network device 12, 14, 16, 31, 41, 98-104 via the communications network 18, 18'. The selection input response message including confirmation of consumable items ordered from which preferred vendors, delivery preferences and storing of shared list preferences.

In one embodiment, the created replenish list 37 further includes automatic replenishment information and Method 142 processes and stores automatic replenishment information. However, the present invention is not limited to such an embodiment and other embodiments may be used to practice the invention.

FIG. 10 is a flow diagram illustrating a Method 152 for automatically replenishing consumable items. At Step 154, one or more first collaboration request messages are sent from the replenish application on the network device to one or more other network devices each with one or more processors included on the shared list via the communications network, the one or more first collaboration messages indicating the network device is at a physical location for a desired vendor who sells consumable items. At Step 156, one or more second collaboration request messages are sent from the replenish application on the network device to one or more other network devices via the communications network, the one or more second collaboration request messages requesting one or more consumable items desired by the one or more other network devices to be purchased by the network device for other one or more network devices. At Step 158, one or more second collaboration response messages are received on the replenish application on the network device from the or more other network devices via the communications network, the one or more one or more second collaboration response messages including one or more consumable items to be purchased for the one or more other network devices. At Step 160, replenish application on the network device initiates purchasing, automatic electronic payment and automatic selection of delivery options for the one or more consumable items to be purchased for the one or more other network devices at the physical location of the desired vendor. At 162, one or more collaboration purchase confirmation messages are sent from the replenish application on the network device to the or more other network devices via the communications network confirming purchase of the one or more consumable items at the physical location of the desired vendor.

The present invention is illustrated with an exemplary embodiment. However, the present invention is not limited to such an embodiment and other embodiments can be used to practice the invention.

In such an exemplary embodiment in FIG. 10 at Step 154, one or more first collaboration request messages are sent from the replenish application 30 on the network device e.g., 12 to one or more other network devices 14, 16, 31, 41, 98-104 each with one or more processors included on the shared list 39 via the communications network 18, 18', the one or more first collaboration messages indicating the network device 12 is at a physical location for a desired vendor who sells consumable items.

At Step 156, one or more second collaboration request messages are sent from the replenish application 30 on the network device 12 to one or more other network devices 14, 16, 31, 41, 98-104 via the communications network 18, 18', the one or more second collaboration request messages requesting one or more consumable items desired by the one or more other network devices 14, 16, 31, 41, 98-104 to be purchased by the network device 12 for other one or more network devices 14, 16, 31, 41, 98-104.

At Step 160, the replenish application 30 on the network device 12 initiates purchasing, automatic electronic payment and automatic selection of delivery options for the one or more consumable items to be purchased for the one or more other network devices 14, 16, 31, 41, 98-104 at the physical location of the desired vendor.

At 162, one or more collaboration purchase confirmation messages are sent from the replenish application 30 on the network device 12 to the or more other network devices 14, 16, 31, 41, 98-104 via the communications network 18, 18' confirming purchase of the one or more consumable items at the physical location of the desired vendor.

In one embodiment, Community members work together and assist each other with purchases of desired consumable items 25. The replenish application 30 on the network device 12, 14, 16, 31, 41, 98-104 further includes a "Request" feature allowing consumer to identify specific consumable items they need replenished, place it on their individualized Shared List 39 and publish to their Community via a push notification (e.g., in the form of a text message, email message, voice mail message, etc.). Such a consumable item includes consumable items the consumer has run out of and needs to purchase, but the consumer does not want to or need to make a trip to a vendor at that time for a single or few desired consumable items.

The replenish application 30 on the network device 12, 14, 16, 31, 41, 98-104 further includes functionality for a consumer to request purchase of a few discrete items from a specific desired vendor like COSTCO, TARGET WAL-MART, which the consumer does not shop at on a regular basis. By placing these items on a Request list across their Community, they could leverage other consumer vendor visit to procure the item(s) thru their Community.

A Community member who receives the Request from another consumer can chose to accept the Request if they are visiting the vendor in question or at another vendor where they can procure the requested consumable item.

The replenish application 30 on the network device 12, 14, 16, 31, 41, 98-104 further includes the use of location mapping software application (e.g., Global Positioning System (GPS) mapping software, etc.) to identify when replenish application 30 on the network device 12 is at a physical location for a vendor and search across any active requests for that vendor to send a reminder message to other network device 12, 14, 16, 31, 41, 98-104 in their Community to consumers who need the consumable items from that vendor.

In one embodiment, the location mapping software application, includes GOOGLE maps, APPLE maps, BING maps, MAPQUEST maps, etc. However, the present invention is not limited to such an embodiment and other embodiments can be used to practice the invention.

The replenish application 30 on the network device 12, 14, 16, 31, 41, 98-104 further includes a notification capability for the consumer to notify their Community via a push message (e.g., text, email, voice mail, etc.) that the consumer is planning to visit a specific physical location of a vendor to see if any Community members have specific requests or needs for consumable products at the physical location for a desired vendor.

The replenish application 30 on the network device 12, 14, 16, 31, 41, 98-104 further includes functionality to allow other Community members to see when they are at a physical location for a desired vendor so the Community member could be notified and have the opportunity to reach out to the consumer and dynamically request a desired consumer item(s). In one embodiment, this functionality may only be allowed for 1st tier Family members or very close relationships within the 2nd tier Friend community. This functionality is turned on or off within the Community Permissions in the replenish application 30 on the network device 12, 14, 16, 31, 41, 98-104.

Once location sharing is enabled between Community members, consumers use location mapping to send out push notification message when another consumer in a Community is within X-miles of a desired physical location of a desired vendor (e.g. a consumer sets up a Request across their Community that they need specific item from a COSTCO. A consumer's spouse is driving from appointment and location software determines that they are within 5 miles of a COSTCO. The replenish application 30 on the network device 12 notifies with a push message replenish application 30 on the network device e.g. 14, of the spouse that there is a request for one or more consumable items from nearby COSTOCO and then provide driving directions if Request is accepted replenish application 30 on the network device e.g. 14, of the spouse.

Once Community member agrees and purchases item for Community member, replenish application 30 on the network device 14 is used to both communicate to Requestor that their request consumable item has been purchased and also communicate a cost so Requestor could then both pay for the item and arrange pickup from Community member. The replenish application 30 on the network device 12, 14, 16, 31, 41, 98-104 allows payment of Community member by Requestor using an electronic pay service like VENMO, etc. If User and Community member have provided location sharing permission, replenish application 30 on the network device 12, 14, 16, 31, 41, 98-104 notifies Requestor either: (1) when purchasing Community member arrives at their residence (so Requestor can plan to drive over and retrieve the purchased consumable items); or (2) track a Community member's arrival to their own residence so they can go outside and great purchaser and receive item(s). This is particularly important for perishable, melting or frozen items.

In one embodiment, the replenish application 30 provides functionality: (1) to store lists and share the stored lists with others; (2) to replenish consumable items from multiple server network devices providing multiple different types of consumable items; (3) to share coupons for consumable items and to apply coupons shareable by others; (4) to specifically set a date each week, month, etc. for replenishment without further interaction; and (5) to send and receive replenish orders from a proprietary, private and/or public server network device. However, the present invention is not limited to these embodiments and other embodiments with other functionality can be used to practice the invention.

A method and system for automatically replenishing consumable items is presented herein. A consumer is allowed to scan in product codes for consumable items with a camera component on a network device such as a mobile phone. The consumer is also allowed to select desired vendors from which to purchase the selected consumable items, select payment options, select delivery options, create and select list of consumable items to be automatically replenished and create and select lists of consumable items that can be shared on-line and on social media so family, relatives, friends, neighbors of the consumer can purchase items for the consumer when the family, relatives, friends, neighbors are doing their own shopping.

It should be understood that the architecture, programs, processes, methods and systems described herein are not related or limited to any particular type of computer or network system (hardware or software), unless indicated otherwise. Various types of specialized computer systems with specialized hardware and software components may be used with or perform operations in accordance with the teachings described herein to practice the invention.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the proceeding described and equivalents thereto are identified and claimed as the invention.

We claim:

1. A method for automatically replenishing consumable items, comprising:
   scanning one or more product codes for one or more consumable items with a camera component on a replenish application on a network device with one or more processors;
   displaying a picture or a graphical image of the one or more desired consumable items corresponding to the scanned one or more product codes for the one or more desired consumable items on the replenish application on the network device;
   displaying one or more other pictures or one or more graphical images or an electronic list of other consumable items available from other companies who sell consumable items similar to the one or more consumable items from the scanned one or more product codes on the replenish application on the network device;
   displaying a list of electronic coupons for the one or more desired consumable items on the replenish application on the network device;
   displaying a list of preferred vendors who can supply the one or more desired consumable items on the replenish application on the network device;
   displaying a list of delivery options for the one or more desired consumable items on the replenish application on the network device;
   displaying a list of electronic payment options to purchase the one or more desired consumable items on the replenish application on the network device;
   displaying a list of one or more other network devices each with one or more processors who have permission to view a shared list of the one or more desired consumable items on the replenish application on the network device;
   creating a replenish list for one or more desired consumable items including: (1) one or more desired consumable items selected with a scanned product code, (2) any desired consumable items selected from other consumable items available from other companies who sell consumable items similar to the one or more consumable items from the scanned one or more product codes, (3) any electronic coupons selected, (4) one or more preferred vendors from the list of preferred vendors, (5) one or more delivery options from the list of delivery options, (6) one or more electronic payment types, (7) one or more other network devices from the list of other network devices who have permission to view a shared list of the one or more desired consumable items, and (8) automatic replacement information for the one or more desired consumable items;
   sending one or more selection input request messages from the replenish application on the network device to a server replenish application on a server network device with one or more processors via a communications network to purchase one or more desired consumable items, the one or more selection input request messages including the created replenish list;
   receiving a selection input response message on the replenish application on the network device from the server replenish application on the server network device via the communications network, the selection input response message including confirmation of receipt the information provided in the created replenish list;
   sending one or more first collaboration request messages from the replenish application on the network device to one or more other network devices each with one or more processors included on the shared list via the communications network, the one or more first collaboration messages indicating the network device is at a physical location for a desired vendor who sells consumable items;
   sending one or more second collaboration request messages from the replenish application on the network device to one or more other network devices via the communications network, the one or more second collaboration request messages requesting one or more consumable items desired by the one or more other network devices to be purchased by the network device for other one or more network devices;
   receiving one or more second collaboration response messages on the replenish application on the network device from the one or more other network devices via the communications network, the one or more one or more second collaboration response messages including one or more consumable items to be purchased for the one or more other network devices;
   initiating from the replenish application on the network device purchasing, automatic electronic payment and automatic selection of delivery options for the one or more consumable items for the to be purchased for the one or more other network devices at the physical location of the desired vendor; and
   sending one or more collaboration purchase confirmation messages from the replenish application on the network device to the or more other network devices via the communications network confirming purchase of the one or more consumable items at the physical location of the desired vendor.

2. The method of claim 1 wherein the network device further includes a smart speaker component.

3. The method of claim 2 wherein:
   inputting one or more product codes or one or more product descriptions for one or more desired consumable items with audio information on the smart speaker component on the network device;
   displaying audio information for the one or more desired consumable items corresponding to the inputted one or more product codes for the one or more desired consumable items on the application on the smart speaker network device;

displaying audio information for other consumable items available from other companies who sell consumable items similar to the one or more consumable items from the scanned one or more product codes on the application on the smart speaker network device;

displaying audio information including a list of electronic coupons for the one or more desired consumable items on the application on the smart speaker network device;

displaying audio information for a list of preferred vendors who can supply the one or more desired consumable items on the application on the smart speaker network device;

displaying audio information for a list of delivery options for the one or more desired consumable items on the application on the application on the smart speaker network device;

displaying audio information for a list of electronic payment options to purchase the one or more desired consumable items on the application on the smart speaker network device;

displaying audio information for a list of one or more other network devices each with one or more processors who have permission to view a shared list of the one or more desired consumable items on the application on the smart speaker network device;

creating a replenish list for one or more desired consumable items including: (1) one or more desired consumable items selected with a scanned product code, (2) any desired consumable items selected from other consumable items available from other companies who sell consumable items similar to the one or more consumable items from the scanned one or more product codes, (3) any electronic coupons selected, (4) one or more preferred vendors from the list of preferred vendors, (5) one or more delivery options from the list of delivery options, (6) one or more electronic payment types, (7) one or more other network devices from the list of other network devices who have permission to view a shared list of the one or more desired consumable items, and (8) automatic replacement information for the one or more desired consumable items;

sending one or more selection input request messages from the application on the smart speaker network device to a server replenish application on a server network device with one or more processors via a communications network to purchase one or more desired consumable items, the one or more selection input request messages including the created replenish list;

receiving one or more selection input response messages on the application on the smart speaker network device from the server replenish application on the server network device via the communications network, the selection input response message including confirmation of the information provided in the created replenish list; and displaying audio information on the application on the smart speaker network device confirming information provided in the created replenish list for the one or more desired consumable items.

4. The method of claim 1 wherein displaying the list of other consumable items available from other companies who sell consumable items similar to the one or more consumable items from the scanned one or more product codes, electronic coupons and preferred vendors is display using a subscription service.

5. The method of claim 4 wherein the subscription service includes a priority display ordering, wherein a company can purchase a desired spot in the priority display ordering.

6. The method of claim 1 wherein items on the created replenish list are selectable to include or not to include on the shared list and the shared list includes all of the one or more desired consumable items from the replenish list or only selected ones of the one or more desired consumable items from the replenish list.

7. The method of claim 1 wherein the replenish list further includes replenish information added to the replenish list by the replenish application on the network device based on a pre-determined time period required to use a selected desired consumable item, wherein the pre-determined time period is determined from the replenish application on the network device.

8. The method of claim 1 wherein the replenish list further includes automatic replenish information to automatically add one or more desired consumable items to the replenish list based on a pre-determined time period.

9. The method of claim 8 wherein the pre-determined time period is automatically determined on the server replenish application on the server network device with one or more Artificial Intelligence (AI) methods including one or more Big Data methods.

10. The method of claim 1 wherein the server network device includes a plurality of cloud applications and one or more cloud databases communicating with a cloud communications network, the plurality of cloud applications providing a plurality of cloud replenishing services for consumable items including: a cloud computing Infrastructure as a Service (IaaS), a cloud computing Platform as a Service (PaaS) and one or more replenishing services for consumable items functionality as a Software as a Service (SaaS).

11. The method of claim 1 wherein the replenish application on the network device further includes a parental control security feature to prevent selected ones of desired consumable items to be selected and added to the created replenish list.

12. The method of claim 1 wherein the wherein items on created replenish list are selectable to display or not display on the replenish application on the network device.

13. The method of claim 1 wherein the created replenish list further includes automatic replenishment information for one or more of the one or more desired consumable items on the created replenish list.

14. The method of claim 1 wherein the created replenish list further includes a household inventory list of desired consumable items, wherein the household inventory includes a list of consumable items used to create meal plans.

15. The method of claim 14 wherein the replenish application on the network device displays a near empty or empty status for consumable items in the household inventory.

16. The method of claim 1 further comprising:
receiving on the server replenish application on the server network device the one or more selection input request messages from the replenish application on the network device via the communications network, the selection input request message includes, the created replenish list, including, but is not limited to: (1) one or more desired consumable items selected with a scanned product code, (2) any desired consumable items selected from other consumable items available from other companies who sell consumable items similar to the one or more consumable items from the scanned one or more product codes, (3) any electronic coupons selected, (4) one or more preferred vendors from the list of preferred vendors, (5) one or more delivery options from the list of delivery options, (6) one or more electronic payment types, (7) one or more other network devices from the list of other network devices who have permission to view a shared list of the one or more desired consumable items, and (8) the automatic replacement information for the one or more desired consumable items;

storing on the server replenish application on the server network device created replenish list information from the one or more selection input request messages in one or more databases associated with server network device;

initiating from the server replenish application on the server network device initiates automatic ordering, automatic electronic payment and automatic selection of delivery options for the one or more desired consumable items from the one or more preferred vendors by sending one or more sale request messages to one or more other server network devices each with one or more processors for the one or one more preferred vendors via the communications network;

receiving on the server replenish application on server network device one or more sale response messages from the one or more other server network devices for the one or more preferred vendors confirming orders, electronic payment and delivery options of the one or more desired consumable items; and sending from the server replenish application on the server network device sends a selection input response message to the replenish application on the network device via the communications network, the selection input response message including confirmation of consumable items ordered from which preferred vendors, delivery preferences and storing of shared list preferences.

17. The method of claim 1 further comprising:
conducting a test on the server replenish application on the server network device to determine if any consumable items need to be automatically replenished at a current day and time, and if so,
initiating from the server replenish application on the server network device automatic ordering, automatic electronic payment and automatic selection of delivery options for the one or more desired consumable items from the one or more preferred vendors by sending one or more sale request messages to one or more other server network devices each with one or more processors for the one or one more preferred vendors via the communications network, receiving on the server replenish application on server network device receives one or more sale response messages from the one or more other server network devices via the communications network for the one or more preferred vendors confirming orders, electronic payment and delivery options of the one or more desired consumable items, and sending from the server replenish application on the server network device sends the selection input response message to the replenish application on the network device via the communications network, the selection input response message including confirmation of consumable items ordered from which preferred vendors, delivery preferences, storing of automatic replenish preferences and storing of shared list preferences.

18. The method of claim 1 wherein the replenish application on the network device uses a location mapping application to display its physical location at the desired vendor on the other replenish applications on the one or more other network devices and to display current physical locations of the one or more other network devices the replenish application on the network device.

19. The method of claim 1 wherein network device includes: desktop computers, laptop computers, tablet computers, mobile phones, non-mobile phones, smart phones, personal digital/data assistants (PDA), digital cameras, portable game consoles, non-portable game consoles, wearable network devices, Internet of Things (IoT) network devices, tabletop product code scanner network devices, cable television (CATV) set-top boxes, satellite television boxes, or digital televisions including high-definition (HDTV) and three-dimensional (3D) televisions.

20. The method of claim 1 wherein the network device and the server network device include one or more wireless communications interfaces comprising: cellular telephone, 802.11a, 802.11b, 802.11g, 802.11n, 802.15.4 (ZigBee), Wireless Fidelity (Wi-Fi), Wi-Fi Aware, Worldwide Interoperability for Microwave Access (WiMAX), ETSI High Performance Radio Metropolitan Area Network (HIPERMAN), Near Field Communications (NFC), Machine-to-Machine (M2M), 802.15.1 (Bluetooth), or infra data association (IrDA), wireless communication interfaces.

21. A system for automatically replenishing consumable items, comprising in combination:
a communications network;
one or more network devices each with a replenishment application and one or more processors;
one or more server network devices each with a server replenishment application and one or more processors;
for scanning one or more product codes for one or more consumable items with a camera component on a replenish application on a network device with one or more processors;
for displaying a picture or a graphical image of the one or more desired consumable items corresponding to the scanned one or more product codes for the one or more desired consumable items on the replenish application on the network device;
for displaying one or more other pictures or one or more graphical images or an electronic list of other consumable items available from other companies who sell consumable items similar to the one or more consumable items from the scanned one or more product codes on the replenish application on the network device;
for displaying a list of electronic coupons for the one or more desired consumable items on the replenish application on the network device;
for displaying a list of preferred vendors who can supply the one or more desired consumable items on the replenish application on the network device;
for displaying a list of delivery options for the one or more desired consumable items on the replenish application on the network device;
for displaying a list of electronic payment options to purchase the one or more desired consumable items on the replenish application on the network device;
for displaying a list of one or more other network devices each with one or more processors who have permission to view a shared list of the one or more desired consumable items on the replenish application on the network device;

for creating a replenish list for one or more desired consumable items including: (1) one or more desired consumable items selected with a scanned product code, (2) any desired consumable items selected from other consumable items available from other companies who sell consumable items similar to the one or more consumable items from the scanned one or more product codes, (3) any electronic coupons selected, (4) one or more preferred vendors from the list of preferred vendors, (5) one or more delivery options from the list of delivery options, (6) one or more electronic payment types, (7) one or more other network devices from the list of other network devices who have permission to view a shared list of the one or more desired consumable items and (8) automatic replacement information for one or more selected consumable items;

for sending one or more selection input request messages from the replenish application on the network device to a server replenish application on a server network device with one or more processors via a communications network to purchase one or more desired consumable items, the one or more selection input request messages including the created replenish list;

for receiving a selection input response message on the replenish application on the network device from the server replenish application on the server network device via the communications network, the selection input response message including confirmation of receipt the information provided in the created replenish list;

for receiving on the server replenish application on the server network device the one or more selection input request messages from the replenish application on the network device via the communications network, the selection input request message includes, the created replenish list, including, but is not limited to: (1) one or more desired consumable items selected with a scanned product code, (2) any desired consumable items selected from other consumable items available from other companies who sell consumable items similar to the one or more consumable items from the scanned one or more product codes, (3) any electronic coupons selected, (4) one or more preferred vendors from the list of preferred vendors, (5) one or more delivery options from the list of delivery options, (6) one or more electronic payment types, (7) one or more other network devices from the list of other network devices who have permission to view a shared list of the one or more desired consumable items and (8) the automatic replacement information for one or more selected consumable items;

for storing on the server replenish application on the server network device created replenish list information from the one or more selection input request messages in one or more databases associated with server network device;

for initiating from the server replenish application on the server network device initiates automatic ordering, automatic electronic payment and automatic selection of delivery options for the one or more desired consumable items from the one or more preferred vendors by sending one or more sale request messages to one or more other server network devices each with one or more processors for the one or one more preferred vendors via the communications network;

for receiving on the server replenish application on server network device one or more sale response messages from the one or more other server network devices for the one or more preferred vendors confirming orders, electronic payment and delivery options of the one or more desired consumable items;

for sending from the server replenish application on the server network device sends a selection input response message to the replenish application on the network device via the communications network, the selection input response message including confirmation of consumable items ordered from which preferred vendors, delivery preferences and storing of shared list preferences; and for conducting a test on the server replenish application on the server network device to determine if any consumable items need to be automatically replenished at a current day and time, if so, for initiating from the server replenish application on the server network device automatic ordering, automatic electronic payment and automatic selection of delivery options for the one or more desired consumable items from the one or more preferred vendors by sending one or more sale request messages to one or more other server network devices each with one or more processors for the one or one more preferred vendors via the communications network, for receiving on the server replenish application on server network device receives one or more sale response messages from the one or more other server network devices via the communications network for the one or more preferred vendors confirming orders, electronic payment and delivery options of the one or more desired consumable items, and for sending from the server replenish application on the server network device sends the selection input response message to the replenish application on the network device via the communications network, the selection input response message including confirmation of consumable items ordered from which preferred vendors, delivery preferences, storing of automatic replenish preferences and storing of shared list preferences;

for sending one or more first collaboration request messages from the replenish application on the network device to one or more other network devices each with one or more processors included on the shared list via the communications network, the one or more first collaboration messages indicating the network device is at a physical location for a desired vendor who sells consumable items;

for sending one or more second collaboration request messages from the replenish application on the network device to one or more other network devices via the communications network, the one or more second collaboration request messages requesting one or more consumable items desired by the one or more other network devices to be purchased by the network device for other one or more network devices;

for receiving one or more second collaboration response messages on the replenish application on the network device from the one or more other network devices via the communications network, the one or more one or more second collaboration response messages including one or more consumable items to be purchased for the one or more other network devices;

for initiating from the server replenish application on the server network device purchasing, automatic electronic payment and automatic selection of delivery options for the one or more consumable items for the to be purchased for the one or more other network devices at the physical location of the desired vendor; and for sending one or more collaboration purchase confirmation messages from the replenish application on the network device to the or more other network devices via the communications network confirming purchase of the one or more consumable items at the physical location of the desired vendor.

22. A method for automatically replenishing consumable items, comprising:

scanning one or more product codes for one or more consumable items with a camera component on a replenish application on a network device with one or more processors;

displaying a picture or a graphical image of the one or more desired consumable items corresponding to the scanned one or more product codes for the one or more desired consumable items on the replenish application on the network device;

displaying one or more other pictures or one or more graphical images or an electronic list of other consumable items available from other companies who sell consumable items similar to the one or more consumable items from the scanned one or more product codes on the replenish application on the network device;

displaying a list of electronic coupons for the one or more desired consumable items on the replenish application on the network device;

displaying a list of preferred vendors who can supply the one or more desired consumable items on the replenish application on the network device;

displaying a list of delivery options for the one or more desired consumable items on the replenish application on the network device;

displaying a list of electronic payment options to purchase the one or more desired consumable items on the replenish application on the network device;

displaying a list of one or more other network devices each with one or more processors who have permission to view a shared list of the one or more desired consumable items on the replenish application on the network device;

creating a replenish list for one or more desired consumable items including: (1) one or more desired consumable items selected with a scanned product code, (2) any desired consumable items selected from other consumable items available from other companies who sell consumable items similar to the one or more consumable items from the scanned one or more product codes, (3) any electronic coupons selected, (4) one or more preferred vendors from the list of preferred vendors, (5) one or more delivery options from the list of delivery options, (6) one or more electronic payment types, (7) one or more other network devices from the list of other network devices who have permission to view a shared list of the one or more desired consumable items and (8) automatic replacement information for one or more selected consumable items;

sending one or more selection input request messages from the replenish application on the network device to a server replenish application on a server network device with one or more processors via a communications network to purchase one or more desired consumable items, the one or more selection input request messages including the created replenish list;

receiving a selection input response message on the replenish application on the network device from the server replenish application on the server network device via the communications network, the selection input response message including confirmation of receipt the information provided in the created replenish list;

receiving on the server replenish application on the server network device the one or more selection input request messages from the replenish application on the network device via the communications network, the selection input request message includes, the created replenish list, including, but is not limited to: (1) one or more desired consumable items selected with a scanned product code, (2) any desired consumable items selected from other consumable items available from other companies who sell consumable items similar to the one or more consumable items from the scanned one or more product codes, (3) any electronic coupons selected, (4) one or more preferred vendors from the list of preferred vendors, (5) one or more delivery options from the list of delivery options, (6) one or more electronic payment types, (7) one or more other network devices from the list of other network devices who have permission to view a shared list of the one or more desired consumable items and (8) the automatic replacement information for one or more selected consumable items;

storing on the server replenish application on the server network device created replenish list information from the one or more selection input request messages in one or more databases associated with server network device;

initiating from the server replenish application on the server network device initiates automatic ordering, automatic electronic payment and automatic selection of delivery options for the one or more desired consumable items from the one or more preferred vendors by sending one or more sale request messages to one or more other server network devices each with one or more processors for the one or one more preferred vendors via the communications network;

receiving on the server replenish application on server network device one or more sale response messages from the one or more other server network devices for the one or more preferred vendors confirming orders, electronic payment and delivery options of the one or more desired consumable items;

sending from the server replenish application on the server network device sends a selection input response message to the replenish application on the network device via the communications network, the selection input response message including confirmation of consumable items ordered from which preferred vendors, delivery preferences and storing of shared list preferences; and conducting a test on the server replenish application on the server network device to determine if any consumable items need to be automatically replenished at a current day and time, if so, initiating from the server replenish application on the server network device automatic ordering, automatic electronic payment and automatic selection of delivery options for the one or more desired consumable items from the one or more preferred vendors by sending one or more sale request messages to one or more other server network devices each with one or more processors for the one or one more preferred vendors via the communications network, receiving on the server replenish application on server network device receives one or more sale response messages from the one or more other server network devices via the communications network for the one or more preferred vendors confirming orders, electronic payment and delivery options of the one or more desired consumable items, and sending from the server replenish application on the server network device sends the selection input response message to the replenish application on the network device via the communications network, the selection input response message including confirmation of consumable items ordered from which preferred vendors, delivery preferences, storing of automatic replenish preferences and storing of shared list preferences;

sending one or more first collaboration request messages from the replenish application on the network device to one or more other network devices each with one or more processors included on the shared list via the communications network, the one or more first collaboration messages indicating the network device is at a physical location for a desired vendor who sells consumable items;

sending one or more second collaboration request messages from the replenish application on the network device to one or more other network devices via the communications network, the one or more second collaboration request messages requesting one or more consumable items desired by the one or more other network devices to be purchased by the network device for other one or more network devices;

receiving one or more second collaboration response messages on the replenish application on the network device from the one or more other network devices via the communications network, the one or more one or more second collaboration response messages including one or more consumable items to be purchased for the one or more other network devices;

initiating from the server replenish application on the server network device purchasing, automatic electronic payment and automatic selection of delivery options for the one or more consumable items for the to be purchased for the one or more other network devices at the physical location of the desired vendor; and sending one or more collaboration purchase confirmation messages from the replenish application on the network device to the or more other network devices via the communications network confirming purchase of the one or more consumable items at the physical location of the desired vendor.

\* \* \* \* \*